US008626797B2

(12) United States Patent
Migita et al.

(10) Patent No.: US 8,626,797 B2
(45) Date of Patent: Jan. 7, 2014

(54) INFORMATION PROCESSING APPARATUS, TEXT SELECTION METHOD, AND PROGRAM

(75) Inventors: Takahito Migita, Tokyo (JP);
Katsuyoshi Kanemoto, Chiba (JP);
Hiroyuki Masuda, Kanagawa (JP);
Naoto Tsuboi, Kanagawa (JP)

(73) Assignee: Sony Corporation, Tokyo (JP)

( * ) Notice: Subject to any disclaimer, the term of this patent is extended or adjusted under 35 U.S.C. 154(b) by 76 days.

(21) Appl. No.: 13/089,956

(22) Filed: Apr. 19, 2011

(65) Prior Publication Data
US 2011/0264691 A1 Oct. 27, 2011

(30) Foreign Application Priority Data

Apr. 26, 2010 (JP) ................ P2010-101042

(51) Int. Cl.
*G06F 17/30* (2006.01)
(52) U.S. Cl.
USPC .................................................. 707/796
(58) Field of Classification Search
USPC .................................. 707/796, 812
See application file for complete search history.

(56) References Cited

U.S. PATENT DOCUMENTS

| 7,835,859 B2* | 11/2010 | Bill ............................ 701/424 |
| 8,213,913 B2* | 7/2012 | Ghai et al. .................. 455/414.2 |
| 2003/0225509 A1* | 12/2003 | Okamoto ..................... 701/201 |
| 2009/0312946 A1* | 12/2009 | Yoshioka et al. ............ 701/208 |
| 2010/0003658 A1* | 1/2010 | Fadel et al. .................. 434/322 |
| 2010/0047748 A1* | 2/2010 | Hwang ........................ 434/157 |
| 2010/0195909 A1* | 8/2010 | Wasson et al. ............... 382/176 |
| 2010/0299615 A1* | 11/2010 | Miluzzo et al. .............. 715/752 |

FOREIGN PATENT DOCUMENTS

JP 2005-292730 10/2005

* cited by examiner

*Primary Examiner* — James Trujillo
*Assistant Examiner* — Soheila Davanlou
(74) *Attorney, Agent, or Firm* — Finnegan, Henderson, Farabow, Garrett & Dunner, L.L.P.

(57) ABSTRACT

Disclosed herein is an information processing apparatus including: a sensor information acquisition section configured to acquire sensor information outputted from a sensor for detecting a user motion and sensor information outputted from a sensor for obtaining a user current location; an action pattern detection block configured to analyze sensor information indicative of a user motion to detect an action pattern corresponding to the acquired sensor information from a plurality of action patterns obtained by classifying user's actions that are executed in a comparatively short time; a keyword conversion block configured to convert, on the basis of the sensor information indicative of a current location, the information into at least one keyword associated with the current location; and a text extraction block configured to extract a text for user presentation from a plurality of texts on the basis of the detected action pattern and the generated at least one keyword.

14 Claims, 32 Drawing Sheets

FIG.3

| | ACTION PATTERN (INCLUDING POSTURES) | | STATUS PATTERN (VEHICLES) |
|---|---|---|---|
| 1 | Walking | 1 | Train |
| 2 | Running | 2 | Elevator |
| 3 | Still | 3 | Car |
| 4 | Pausing | 4 | Bicycle |
| 5 | Jumping | ⋮ | ⋮ |
| 6 | Posture Changing | | |
| 7 | Turning | | |
| ⋮ | ⋮ | | |

FIG. 11

USER ACTION LOG INFORMATION

LOCATION INFORMATION LOG

| USER ID | LONGITUDE | LATITUDE | DATE | PLACE ID | TIME ZONE ID |
|---|---|---|---|---|---|
| 1 | 130.33 | 33.51 | 2010/04/01 15:03 | 1 | 7 |
| 2 | 135.00 | 35.48 | 2010/04/03 22:08 | 2 | 77 |
| 3 | 139.18 | 36.04 | 2010/04/05 11:54 | 3 | 677 |
| ... | | | | | ... |

INFORMATION ABOUT PLACES FREQUENTLY VISITED

| USER ID | PLACE ID | TIME ZONE ID | SCORE |
|---|---|---|---|
| 1 | 1 | 7 | 1.00 |
| 2 | 2 | 77 | 0.99 |
| 3 | 3 | 677 | 0.83 |
| ... | | | ... |

INFORMATION ABOUT LOCATIONS TO BE VISITED NEXT

| USER ID | PLACE ID OF CURRENT POSITION | PLACE ID OF NEXT PLACE | TIME ZONE ID | SCORE |
|---|---|---|---|---|
| 1 | 2 | 1 | 11 | 2.11 |
| 2 | 2 | 3 | 1 | 3.56 |
| 3 | 2 | 1 | 1 | 9.11 |
| ... | | | | ... |

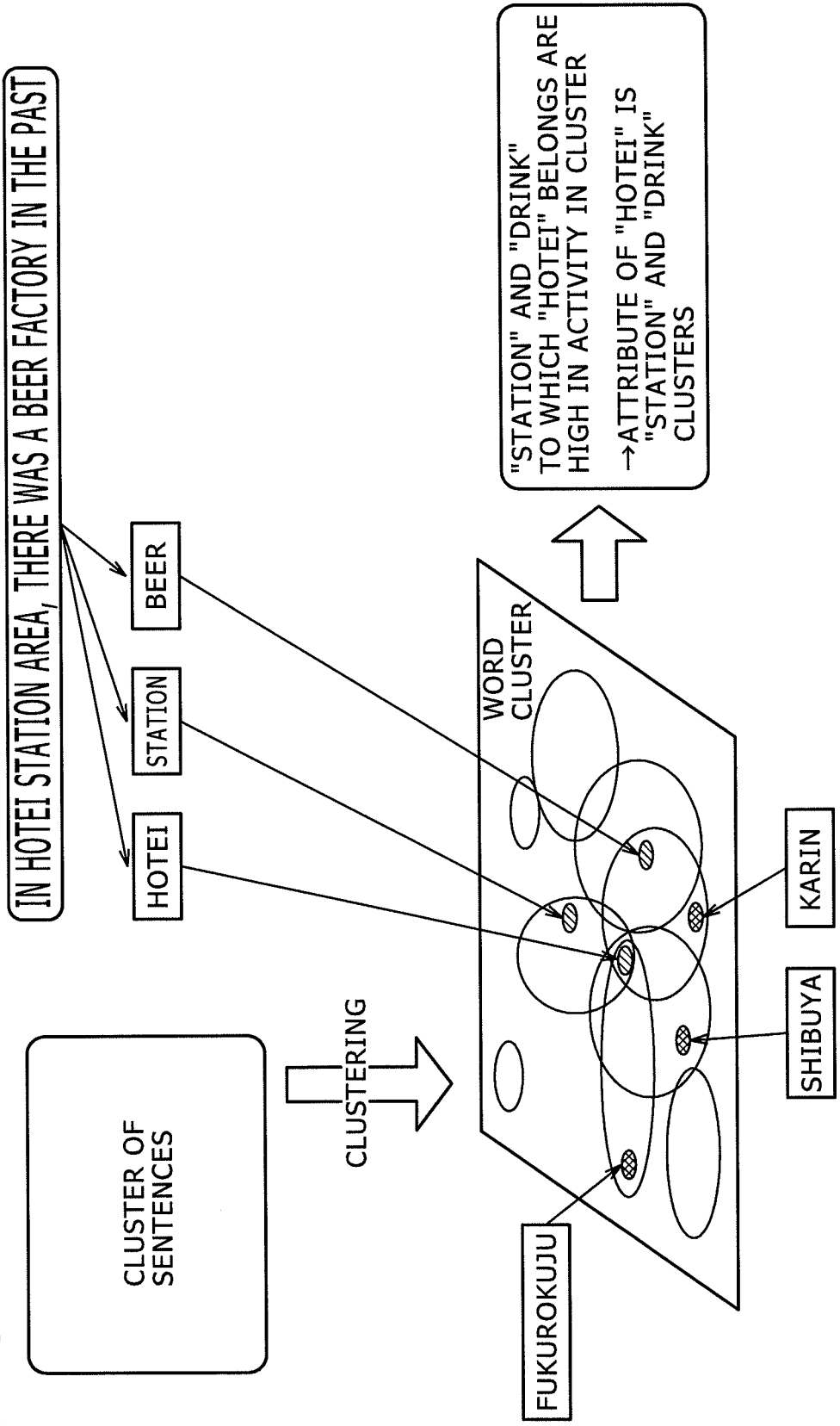

FIG.16
SENTENCE X
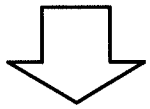
SENTENCE X LOG INFORMATION
| CONTEXT (MOTION, STATES) | COUNT |
|---|---|
| MOVING: TRAIN | 60 |
| SHOPPING | 10 |
| MOVING: WALKING | 6 |
| TAKING MEAL | 3 |
| MOVING: CAR | 1 |
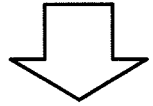
"MOVING: RAILROAD" CONTEXT IS HIGH IN PROBABILITY

FIG. 17

TEXT DATABASE

INFORMATION ABOUT SENTENCE

| SENTENCE ID | SENTENCE TYPE | SENTENCE | LEVEL | LANGUAGE ID | RELATED-SENTENCE ID |
|---|---|---|---|---|---|
| 1 | SAMPLE | HOTEI STATION WAS A STATION FOR SHIPPING BEERS AT THE BEGINNING | 1 | 1 | 11 |
| 2 | QUESTION | WHAT IS THE NAME OF THIS STREET? | 2 | 2 | 24 |
| 3 | QUESTION | HOW LONG DOES IT TAKE TO ARRIVE AT HOTEI STATION? | 2 | 1 | 115 |
| ... | | ... | ... | ... | ... |

INFORMATION ABOUT KEYWORDS

| KEYWORD ID | KEYWORD | ATTRIBUTE | SCORE |
|---|---|---|---|
| 1 | HOTEI STATION | BUILDING: RAILROAD: STATION | 0.5 |
| 2 | BEER | DRINK | 1.2 |
| 3 | street | BUILDING: ROAD | 11.0 |
| ... | ... | ... | ... |

INFORMATION ABOUT CONTEXTS

| SENTENCE ID | CONTEXT | SCORE |
|---|---|---|
| 1 | STATEMENT | 1.0 |
| 2 | MOVING: WALKING | 1.1 |
| 3 | MOVING: RAILRORD | 0.76 |
| ... | ... | ... |

CORRELATION BETWEEN SENTENCE AND KEYWORD

| SENTENCE ID | KEYWORD ID |
|---|---|
| 1 | 1 |
| 2 | 2 |
| 3 | 5 |
| ... | ... |

FIG.23

CORRECT-ANSWER PERCENTAGE TABLE

| QUESTIONING | USER | | | | | |
|---|---|---|---|---|---|---|
| | USER A | | USER B | | ... | |
| | CORRECT ANSWERS | QUESTIONS | CORRECT ANSWERS | QUESTIONS | CORRECT ANSWERS | QUESTIONS |
| 1 | 5 | 20 | 7 | 20 | ... | ... |
| 2 | 6 | 15 | 9 | 17 | ... | ... |
| 3 | 10 | 15 | 14 | 15 | ... | ... |
| ... | ... | ... | ... | ... | ... | ... |

FIG. 24

WRONG ANSWER MATRIX

| QUESTIONING | USER | | | | |
|---|---|---|---|---|---|
| | | USER A | | USER B | ... |
| | | WRONG ANSWERS | QUESTIONS | WRONG ANSWERS | QUESTIONS |
| | 1 | 15 | 20 | 13 | 20 | ⋮ | ⋮ |
| | 2 | 9 | 15 | 8 | 17 | ⋮ | ⋮ |
| | 3 | 5 | 15 | 1 | 15 | ⋮ | ⋮ |
| | ... | ... | ... | ... | ... | ... | ... |

FIG.25

TABLE ASSOCIATED WITH LAST ANSWERING DATE AND COUNTS

| QUESTIONING | USER | | | | | |
|---|---|---|---|---|---|---|
| | USER A | | USER B | | ... | |
| | LAST ANSWERING DATE | ANSWERING COUNTS | LAST ANSWERING DATE | ANSWERING COUNTS | LAST ANSWERING DATE | ANSWERING COUNTS |
| 1 | 2010/04/01 | 20 | 2010/04/01 | 20 | ... | ... |
| 2 | 2010/03/31 | 15 | 2010/03/25 | 17 | ... | ... |
| 3 | 2010/03/05 | 15 | 2010/03/30 | 1 | ... | ... |
| ... | ... | ... | ... | ... | ... | ... |

FIG.26

FORGETTING PERCENTAGE TABLE GROUP

| qTH TIME | | FIRST DAY | | SECOND DAY | | ... | |
|---|---|---|---|---|---|---|---|
| | | CORRECT ANSWERS | QUESTIONS | CORRECT ANSWERS | QUESTIONS | CORRECT ANSWERS | QUESTIONS |
| QUESTIONING | 1 | 5 | 20 | ○○ | □□ | ... | ... |
| | 2 | 6 | 15 | △△ | ○○ | ... | ... |
| | 3 | 10 | 15 | □□ | △△ | ... | ... |
| | ... | ... | ... | ... | ... | ... | ... |

INFORMATION PROCESSING APPARATUS, TEXT SELECTION METHOD, AND PROGRAM

BACKGROUND OF THE INVENTION

1. Field of the Invention

The present invention relates to an information processing apparatus, a text selection method, and a program.

2. Description of the Related Art

Services realized by the advancement of information processing technologies include so-called e-learning systems in which individual person learns various subjects by use of each person's free time at his or her own pace through networks. One of the subjects that can be learned by such e-learning systems is the learning of foreign languages. On the other hand, portable devices for searching for foreign language sentences which can be used during travels have been developed.

SUMMARY OF THE INVENTION

However, related-art e-learning systems are configured to provided only learning materials suitable for users' foreign language proficiency levels. Therefore, each user must determine where and how to use results of his or her e-learning.

Portable devices for searching for foreign language conversational sentences which can be used during travels have also been developed. However, these devices present problems that timely searching for suitable sentences in a specific situation is very troublesome.

Therefore, technologies of enabling a user to search for a proper sentence (or text) suitable for user's current location or user's situation and presenting the results of the searching to the user.

Meanwhile, devices for identifying user's current location or user's body motion to present suitable music content have been proposed (refer to Japanese Patent Laid-open No. 2005-292730), but any specific methods of applying such technologies to foreign language learning have not been developed.

Therefore, the present invention addresses the above-identified and other problems associated with related-art methods and apparatuses and solves the addressed problems by providing an information processing apparatus, a text selection method, and a program that are configured to search for proper sentences (or texts) in accordance with user's current location or user's situation and present the results of the searching to the user.

In carrying out the invention and according to one embodiment thereof, there is provided an information processing apparatus including: a sensor information acquisition section configured to acquire sensor information outputted from a sensor for detecting a user motion and sensor information outputted from a sensor for obtaining a user current location; an action pattern detection block configured to analyze sensor information from the sensor for detecting a user motion acquired by the sensor information acquisition section to detect an action pattern corresponding to the acquired sensor information from a plurality of action patterns obtained by classifying user's actions that are executed in a comparatively short time; a keyword conversion block configured to convert, on the basis of the sensor information indicative of a current location acquired by the sensor information acquisition section, the information indicative of a current location into at least one keyword associated with the current location; and a text extraction block configured to extract a text for user presentation from a plurality of texts on the basis of the action pattern detected by the action pattern detection block and the at least one keyword generated by the keyword conversion block.

The above-mentioned information processing apparatus preferably includes a text analysis block configured to analyze each of the plurality of texts to assign an attribute to each word making up each analyzed text and assign a context indicative of at least one of motion and state indicated by each of the plurality of texts thereto. The keyword conversion block preferably outputs at least one keyword associated with the current location to the text analysis block, and the text analysis block preferably assigns an attribute to the at least one keyword associated with the current location outputted from the keyword conversion block.

The above-mentioned text extraction block preferably refers to the context assigned to each of the plurality of texts, the each word included in each of the plurality of texts, and the attribute assigned to the each word to extract a text that matches at least any one of the action pattern detected by the action pattern detection block, at least one keyword generated by the keyword conversion block, and the attribute assigned to the keyword.

The above-mentioned information processing apparatus preferably includes a positional information analysis block configured to generate information associated with a place of user's frequent visit and a place of user's probable visit next to the current location by use of information indicative of the current location acquired by the sensor information acquisition section and a log of the information indicative of a current location. The keyword conversion block preferably further converts the information associated with a place of user's frequent visit and a place of user's probable visit next to the current location into a keyword.

In the above-mentioned information processing apparatus, if a text with which the attribute matches but the keyword does not match has been extracted, the text extraction block preferably replaces the word included in the extracted text by the keyword generated by the keyword conversion block.

The above-mentioned keyword conversion block preferably converts the information indicative of the current location into a keyword indicative of at least one of an address of the current location, a place name of the current location, and a name of a matter located near the current location.

In carrying out the invention and according to another embodiment thereof, there is provided a text selection method including the steps of: acquiring sensor information outputted from a sensor for detecting a user motion and sensor information outputted from a sensor for obtaining a user current location; analyzing sensor information from the sensor for detecting a user motion acquired in the sensor information acquisition step to detect an action pattern corresponding to the acquired sensor information from a plurality of action patterns obtained by classifying user's actions that are executed in a comparatively short time; converting, on the basis of the sensor information indicative of a current location acquired in the sensor information acquisition step, the information indicative of a current location into at least one keyword associated with the current location; and extracting a text for user presentation from a plurality of texts on the basis of the action pattern detected in the action pattern detection step and the at least one keyword generated in the keyword conversion step.

In carrying out the invention and according to another embodiment thereof, there is provided a program for making a computer capable of communication with a sensor for detecting a user motion and a sensor for detecting a current location realize functions of: acquiring sensor information outputted from a sensor for detecting a user motion and sensor information outputted from a sensor for obtaining a user current location; analyzing sensor information from the sensor for detecting a user motion acquired by the sensor information acquisition function to detect an action pattern corresponding to the acquired sensor information from a plurality of action patterns obtained by classifying user's actions that are executed in a comparatively short time; converting, on the basis of the sensor information indicative of a current location acquired by the sensor information acquisition function, the information indicative of a current location into at least one keyword associated with the current location; and extracting a text for user presentation from a plurality of texts on the basis of the action pattern detected by the action pattern detection function and the at least one keyword generated by the keyword conversion function.

As described and according to the invention, searching for a proper sentence (or text) in accordance with user's current location or user's situation and presenting the results of the searching can be realized.

BRIEF DESCRIPTION OF THE DRAWINGS

Other features and advantages of the invention will become apparent from the following description of embodiments with reference to the accompanying drawings in which:

FIG. 3 is a diagram illustrating one example of user's action patterns (context);

FIG. 11 is a diagram illustrating one example of user action log information;

FIGS. 12 to 16 are diagrams for explaining different text analysis methods;

FIG. 17 is a diagram illustrating one example of a text database;

FIG. 23 is a diagram illustrating one example of a correct answers percentage table associated with the second embodiment;

FIG. 24 is a diagram illustrating one example of a wrong answer matrix associated with the second embodiment;

FIG. 25 is a diagram illustrating one example of a table associated with final answer date and answer count associated with the second embodiment;

FIG. 26 is a diagram illustrating one example of a forgetting percentage table group associated with the second embodiment;

DETAILED DESCRIPTION OF THE PREFERRED EMBODIMENTS

Figure 1:
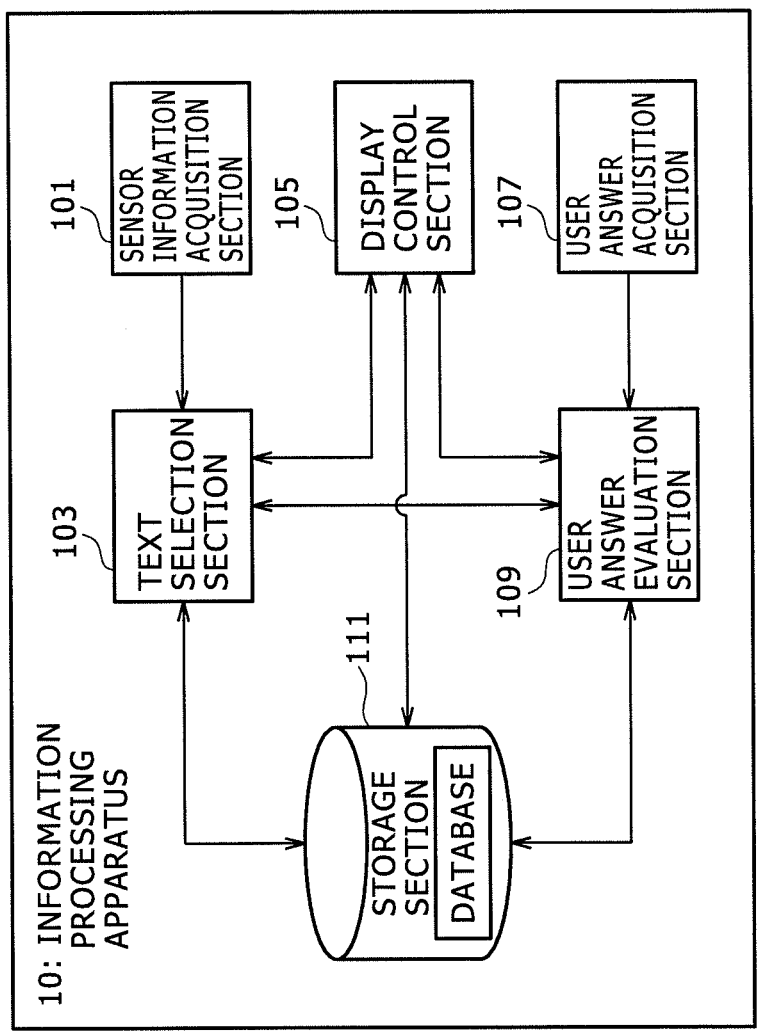
FIG. 1 is a block diagram illustrating an exemplary configuration of an information processing apparatus practiced as a first embodiment of the invention.

This invention will be described in further detail by way of embodiments thereof with reference to the accompanying drawings. It should be noted that, throughout the present specifications and the drawing accompanied thereto, component blocks having substantially the same function are denoted by the same reference numerals and the description of the duplication will be skipped.

The description will be carried out in the following order:
(1) First embodiment
(1-1) Configuration of information processing apparatus
(1-2) Processing flow of information processing method;
(2) Second embodiment
(2-1) Configuration of information processing apparatus
(2-2) Processing flow of questioning tendency setting method;
(3) Third embodiment
(3-1) Configuration of information processing apparatus; and
(4) Hardware configuration of information processing apparatus (computer) associated with the embodiments of the present invention.

(1) First Embodiment

First, an information processing apparatus and a text selection method associated with the first embodiment of the invention will be detailed with reference to FIG. 1 through FIG. 20.

As will be described in detail, an information processing apparatus 10 practiced as the first embodiment is an apparatus that is configured to analyze a current state, a current position, and so on of a user by use of sensor information output from various sensors, thereby selecting a text that matches the obtained user's current state and position.

(1-1) Exemplary Configuration of Information Processing Apparatus

Now, referring to FIG. 1, an exemplary configuration of the information processing apparatus 10 will be described in detail. FIG. 1 is a block diagram illustrating the exemplary configuration of the information processing apparatus 10.

The information processing apparatus 10 associated with the first embodiment mainly has a sensor information acquisition section 101, a text selection section 103, a display control section 105, a user answer acquisition section 107, a user answer evaluation section 109, and a storage section 111 as shown in FIG. 1.

The sensor information acquisition section 101 is realized by a CPU (Central Processing Unit), a ROM (Read Only Memory), a RAM (Random Access Memory), communication apparatus, and so on, for example. The sensor information acquisition section 101 acquires sensor information output from various sensors including a sensor for detecting a user motion (hereafter also referred to as a motion sensor) and a sensor for detecting a current position of a user (hereafter also referred to as a position sensor). The motion sensor may include a three-axis acceleration sensor (including an acceleration sensor, a gravidity detection sensor, and a drop detection sensor, for example), a three-axis gyro sensor (including an angular velocity sensor, hand-shake correction sensor, and a geomagnetism sensor, for example). The position sensor may be a GPS (Global Positioning System) sensor for receiving data output from a GPS. It should be noted that the longitude and latitude of a current position can be obtained from the access points of an RFID (Radio Frequency Identification) device and a Wi-Fi (Wireless Fidelity) device and the information output from wireless base stations, for example, so that these detection means may be used as position sensors. The above-mentioned various sensors may be installed in the information processing apparatus 10 associated with the first embodiment or arranged externally to the information processing apparatus 10.

When the user moves, an acceleration change and a rotation around the gravity axis are detected by the above-mentioned motion sensor. The motion sensor outputs the information about the detected change and rotation. The sensor information acquisition section 101 acquires the information about the change and rotation output from the motion sensor as sensor information. At the same time, in response to a user action, the position sensor obtains positional information (longitude and latitude, for example) indicative of a place at which the user is located (the current position). The sensor information acquisition section 101 outputs the positional information output from the position sensor as sensor information.

It should be noted that, if date information is not related with the acquired information in acquiring the information output from various sensors, then the sensor information acquisition section 101 may relate information indicative of the acquisition date with the acquired information.

The sensor information acquisition section 101 outputs the acquired various types of sensor information to the text selection section 103. Also, the sensor information acquisition section 101 may store acquired various types of information into the storage section 111 to be described later as log information.

The text selection section 103 is realized by a CPU, a ROM, a RAM, and so on, for example. On the basis of the sensor information output from the sensor information acquisition section 101, the text selection section 103 selects a text to be presented to the user from among two or more texts stored in the storage section 111 to be described later or the like.

Selecting the text to be presented to the user from among two or more texts, the text selection section 103 outputs information corresponding to the selected text to the display control section 105 to be described later. Also, if the selected text is like a question sentence for prompting the user for the entry of an answer, for example, then the text selection section 103 outputs the information about the selected text to the user answer evaluation section 109 to be described later.

It should be noted that the text selection section 103 may store the information about the selected text into the storage section 111 to be described later or the like as log information.

The following describes a detail configuration of the text selection section 103 associated with the first embodiment.

The display control section 105 is realized by a CPU, a ROM, a RAM, and so on, for example. The display control section 105 is a processing block for controlling the display of the contents of display screen to be displayed on a display section (not shown) of the information processing apparatus 10. To be more specific, the display control section 105 refers to the information corresponding to a text output from the text selection section 103 to display a text (or a sentence) corresponding to that information on the display screen of the display section.

If the text selected by the text selection section 103 is like a question sentence for prompting the user to enter an answer, then the display control section 105 displays on the display screen an evaluation result (or a correct/wrong evaluation of answer) of a user answer executed by the user answer evaluation section 109 to be described later.

In controlling the display of the display screen, the display control section 105 can use various objects, such as icons, stored in the storage section 111 to be described later or the like or refer to various databases stored in the storage section 111 or the like.

The user answer acquisition section 107 is realized by a CPU, a ROM, a RAM, and an input apparatus, for example. If a text selected by the text selection section 103 is like a question sentence for prompting the user to enter an answer, then the user answer acquisition section 107 acquires a user answer for the selected text. The user answer may be directly entered through a keyboard or a touch panel or entered through the selection of an object, such as an icon, corresponding to the answer by operating a mouse for example. The user answer acquisition section 107 acquires information corresponding to the user answer entered in any of various means and outputs the acquired information to the user answer evaluation section 109 to be described later.

The user answer evaluation section 109 is realized by a CPU, a ROM, a RAM, and so on, for example. If a text selected by the text selection section 103 is like a question sentence for prompting the user to enter an answer, then the user answer evaluation section 109 executes an correct/wrong evaluation on the user answer output from the user answer acquisition section 107.

To be more specific, when the information about a selected text is supplied, the user answer evaluation section 109 refers to the information about the acquired text and acquires the information about the correct answer of the selected text (or question) from a database stored in the storage section 111 or the like. Next, the user answer evaluation section 109 compares the user answer output from the user answer acquisition section 107 with the correct answer to determine whether the user answer is correct or wrong.

When the correct/wrong evaluation on the user answer is completed, the user answer evaluation section 109 may output an evaluation result to the display control section 105. Displaying the evaluation result on the display screen by the display control section 105 allows the user of the information processing apparatus 10 to know whether the user's answer is correct or wrong.

Also, when the correct/wrong evaluation on the user answer is completed, the user answer evaluation section 109 may output information indicative of the completion of the correct/wrong evaluation to the text selection section 103. Outputting this information to the text selection section 103 allows the text selection section 103 to use the acquisition of this information as a trigger of a new processing operation. This allows the text selection section 103 to start a new processing operation, such as requesting the display control section 105 for displaying a newly selected text, for example.

The user answer evaluation section 109 may store a log associated with a user answer evaluation result into the storage section 111 to be described later or the like.

The storage section 111 is one example of a storage apparatus of the information processing apparatus 10 associated with the first embodiment. The storage section 111 stores various databases and various data for use by the text selection section 103 and the user answer evaluation section 109 in executing various processing operations.

Also, the storage section 111 may store various kinds of log information. Further, the storage section 111 may appropriately store various parameters, information about the progression of the processing, and various databases that need to be stored in executing processing by the information processing apparatus 10 associated with the first embodiment.

This storage section 111 is accessible for read/write operations by the component blocks of the information processing apparatus 10.

Configuration of Text Selection Section

Figure 2:
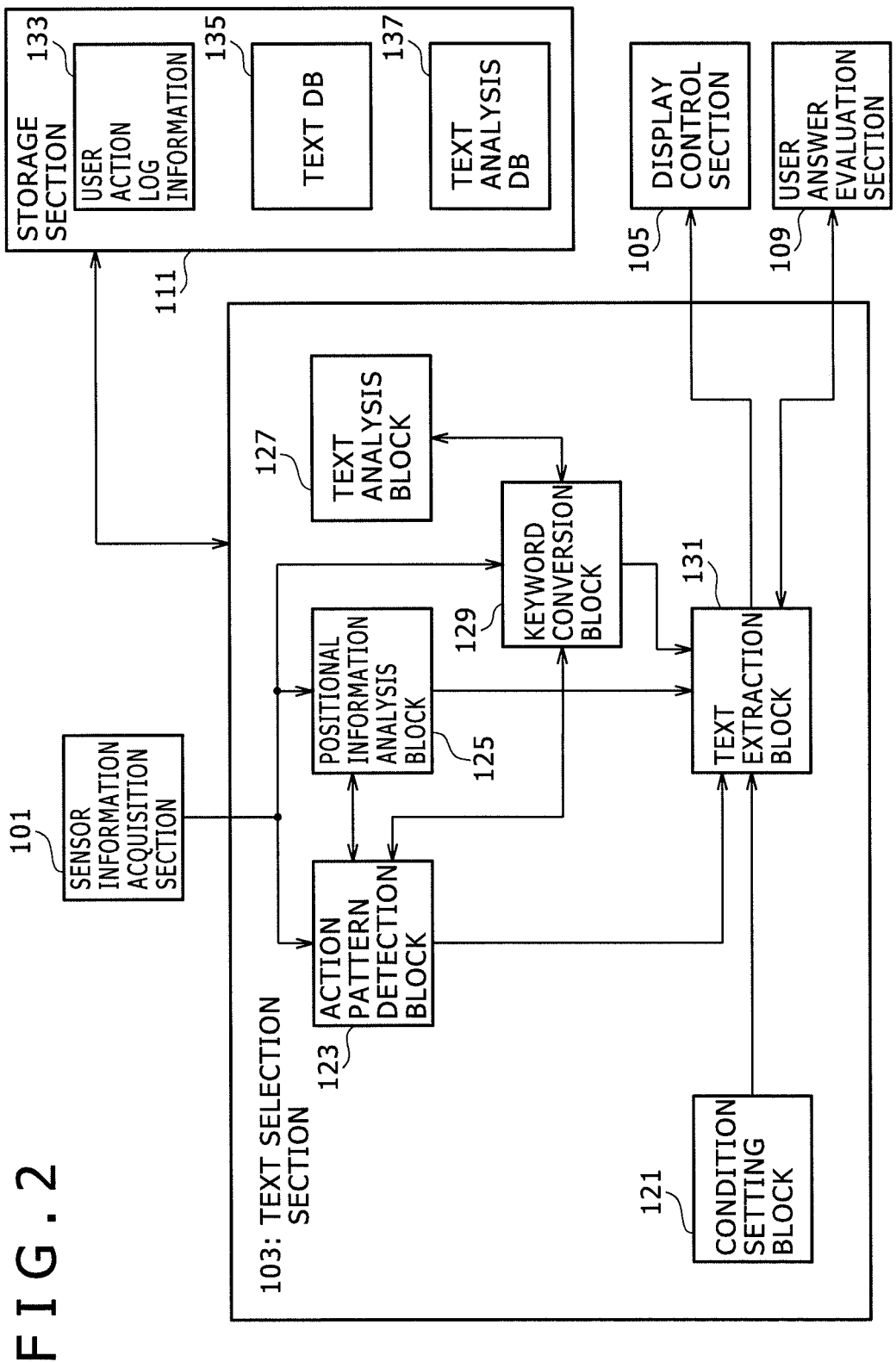
FIG. 2 is a block diagram illustrating an exemplary configuration of a text selection section associated with the first embodiment.

The following describes details of a configuration of the text selection section 103 associated with the first embodiment with reference to FIG. 2. FIG. 2 is a block diagram illustrating an exemplary configuration of the text selection section 103 associated with the first embodiment.

As shown in FIG. 2, the text selection section 103 associated with the first embodiment has a condition setting block 121, an action pattern detection block 123, a positional information analysis block 125, a text analysis block 127, a keyword conversion block 129, and a text extraction block 131.

The condition setting block 121 is realized by a CPU, a ROM, a RAM, an input apparatus, and so on, for example. The condition setting block 121 is a processing block for setting, on the basis of a user operation, conditions for selecting a text from among two or more texts by the text extraction block 131 to be described later. When a text selection condition is entered by the user through the keyboard, mouse, touch panel, or button, for example, the condition setting block 121 outputs the entered information to the text extraction block 131 to be described later.

Text selection conditions may be set appropriately. However, if the text selection section 103 selects a question sentence or sample sentence for language learning, for example, from two or more texts, then the following conditions are set:
the type of the language to be leaned;
the linguistic level of the language to be learned;
the user's movement and state (context to be described later);
the type of location (the current position, a place frequently visited, a place to be visited next, and so on); and
others.

Setting the above-mentioned conditions allows the user to automatically browse texts (or sentences) suited to a situation desired by the user.

The action pattern detection block 123 is realized by a CPU, a ROM, a RAM, and so on, for example. By use of the sensor information output from the motion sensor, the action pattern detection block 123 detects a user motion pattern and state pattern. The motion and state patterns that can be detected by the action pattern detection block 123 include "walking," "running," "still," "jumping," "train (ride/not ride)," "elevator (ride/not ride/up/down)," and so on, for example. It should be noted that methods of detecting the motion and state patterns by the action pattern detection block 123 will be detailed later. It should also be noted that the methods of detecting the motion and state patterns are not limited to those described later; it also practicable to use machine learning for example. The motion and state patterns detected by the action pattern detection block 123 are entered in the text extraction block 131 to be described later.

The following describes the function of the action pattern detection block 123 in detail with reference to FIG. 3 through FIG. 10. FIG. 3 through FIG. 10 shows the function and operation of the action pattern detection block 123.

Configuration of Input/Output Data

As described above, sensor information output from the motion sensor is entered in the action pattern detection block 123. The sensor information to be acquired by the action pattern detection block 123 includes acceleration waveform data (hereafter referred to as acceleration data) for example. It should be noted that this acceleration data includes acceleration data in x direction (x-acc), acceleration data in y direction (y-acc), and acceleration data in z direction (z-acc). Here, x, y, and z are indicative of orthogonal directions. If a gyro sensor is installed, three-dimensional gyro data (x-gyro, y-gyro, and z-gyro) are entered as sensor information. It is desirable that these sensor data be calibrated because the sensitivity of the sensor changes with temperature, atmospheric pressure, and so on, for example.

When sensor information is supplied, the action pattern detection block 123 detects motion and state patterns of a user on the basis of the supplied sensor information. The motion and state patterns that can be detected by the action pattern detection block 123 include "walking," "running," "still," "temporarily still," "jumping," "posture change," "turn," "train (ride/not ride)," "elevator (up/down)," "car (ride)," "bicycle (ride), and so on, for example (refer to FIG. 3).

For example, take an algorithm for detecting a walking state. Normally, the frequency of the acceleration data that is detected when a human is walking is around 2 Hz (about two steps in one second). Therefore, the action pattern detection block 123 analyzes the frequency of the acceleration data to detect a portion with the frequency near 2 Hz. The portion detected by this processing is equivalent to motion and state pattern "walking." In addition, the action pattern detection block 123 can detect the occurrence time and the continuation duration of "walking" motion and state pattern from the acceleration data. Further, the action pattern detection block 123 can detect "walking" intensity from the amplitude of the acceleration data.

Thus, on the basis of the data, such as the frequency, strength, and so on, obtained by analyzing the sensor information, a feature quantity (hereafter referred to as motion and state feature quantity) of each motion and state pattern can be extracted. It should be noted that, in the case of "walking" motion and state pattern, only acceleration data is used; depending on the type of motion and state pattern, gyro data is also used. Obtaining time-depending change in motion and state feature quantity, the action pattern detection block 123 sequentially determines the motion and state patterns from the motion and state feature quantity, thereby outputting time-dependently changing motion and state patterns.

The motion and state patterns thus obtained by the action pattern detection block 123 are entered in the text extraction block 131.

It should be noted that the action pattern detection block 123 can also detect user's action patterns in cooperation with the positional information analysis block 125 or the keyword conversion block 129 to be described later. For example, on the basis of action patterns executed by the user in a comparatively short time of several seconds to several minutes, such as "walking," "running," "jumping," "still," and so on, and various kinds of information provided from the positional information analysis block 125 or the keyword conversion block 129, the action pattern detection block 123 can identify an action pattern that is executed in a longer time, such as "meal," "shopping," and "work."

For example, the cooperation with the positional information analysis block 125 or the keyword conversion block 129 allows identification that the current position of the user is in a restaurant for example. Therefore, if the user current position is moving inside a restaurant, it is determined that the user is walking and being still in the restaurant. So, for such an action pattern, the action pattern detection block 123 can identify an action pattern indicative of "meal." If the user current position is moving in a building owned by a corporation or a so-called business street, then the action pattern detection block 123 can identify the user action pattern to be "work."

In addition, by further considering information about date, the action pattern detection block 123 can consider whether the timing of action pattern detection is a weekday or a holiday, thereby detecting action patterns more correctly.

Further, if the personal information of the user (home address, office address, and so on, for example) is stored for use, referencing this personal information allows the more correct detection of action patterns.

The detection of long-term action patterns, such as "meal," "shopping," and "work" mentioned above is executed before the executing of a detection algorithm to be described below and a detection result is output to the text extraction block 131.

The following describes more detail detection algorithms of some of the motion and state patterns shown in FIG. 3.

Method of Recognizing Pausing/Still State

Figure 4:
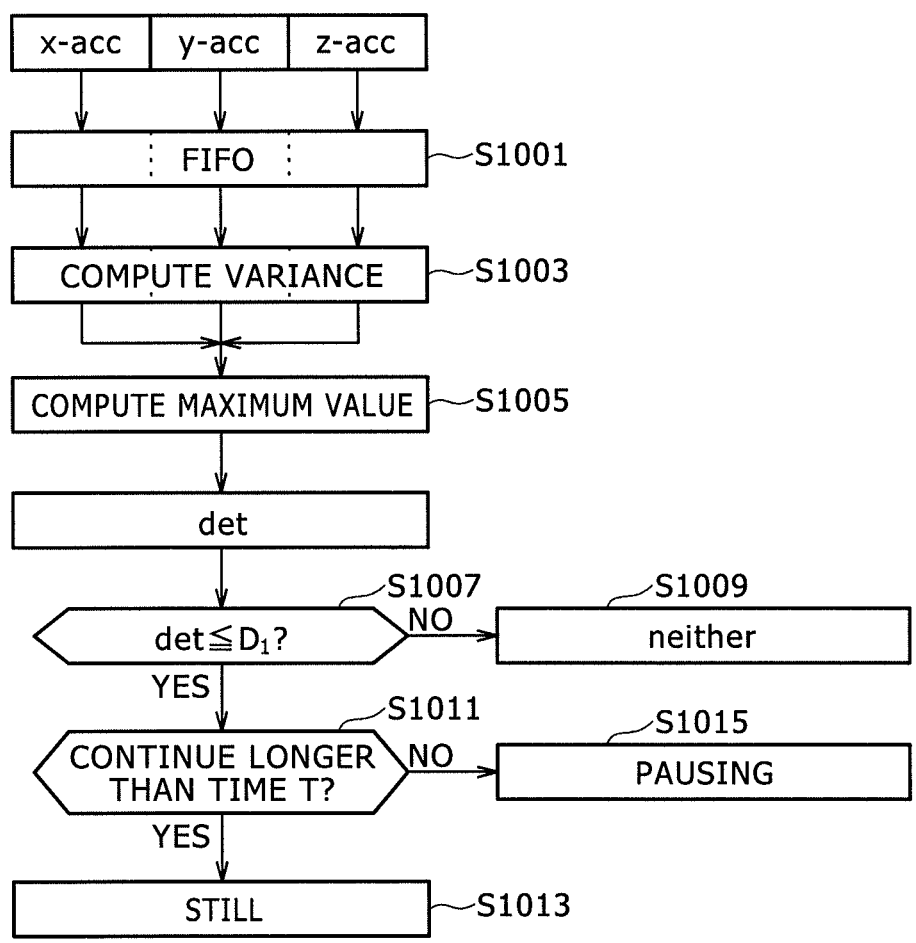
FIGS. 4 through 9 are flowcharts indicative of different examples of action patterns.

First, a method of recognizing whether the user is pausing or being still will be described with reference to FIG. 4. FIG. 4 shows a method of recognizing whether the user is pausing or being still.

First, when the user moves, the corresponding sensor information is entered in the action pattern detection block 123. Here, the acceleration data (x-acc, y-acc, and z-acc) of three-dimensional directions are entered. When the sensor information is entered, the action pattern detection block 123 records the sensor data in a FIFO format (S1001). When the data of a predetermined amount has been recorded, the action pattern detection block 123 computes each of the variances of x-acc, y-acc, and z-acc (S1003). Next, the action pattern detection block 123 extracts a maximum variance (det) for still-state evaluation that is the greatest variance among these variances (S1005).

When maximum variance for still-state evaluation has been detected, the action pattern detection block 123 determines whether the extracted maximum variance for still-state evaluation is equal to or smaller than still-state recognition value $D_1$ indicative of a still state (S1007). If the maximum variance for still-state evaluation is found to be neither equal to nor smaller than $D_1$, then the action pattern detection block 123 determines that the user is not being still. If this determination is made, the user is estimated to be moving. Hence, the action pattern detection block 123 enters the information indicative that the user is not being still into the text extraction block 131 (S1009).

On the other hand, if the maximum variance for still-state evaluation is found to be smaller than $D_1$, then the action pattern detection block 123 determines whether the state in which the maximum variance is smaller than $D_1$ continues longer than still-state recognition time T1 (S1011). Here, T1 is indicative of a shortest time in which the user is regarded as being still. If the maximum variance continues longer than T1, the action pattern detection block 123 determines that the user is being still and enters the information indicative of being still into the text extraction block 131 (S1013). If the maximum variance does not continue longer than T1, the action pattern detection block 123 determines that the user is pausing and enters the information indicative of a pausing state into the text extraction block 131 (S1015).

As described above, executing the determination processing in accordance with the example shown in FIG. 4 allows the determination of a still state, pausing state, and a non-still state.

Method of Recognizing Walking/Running

Figure 5:
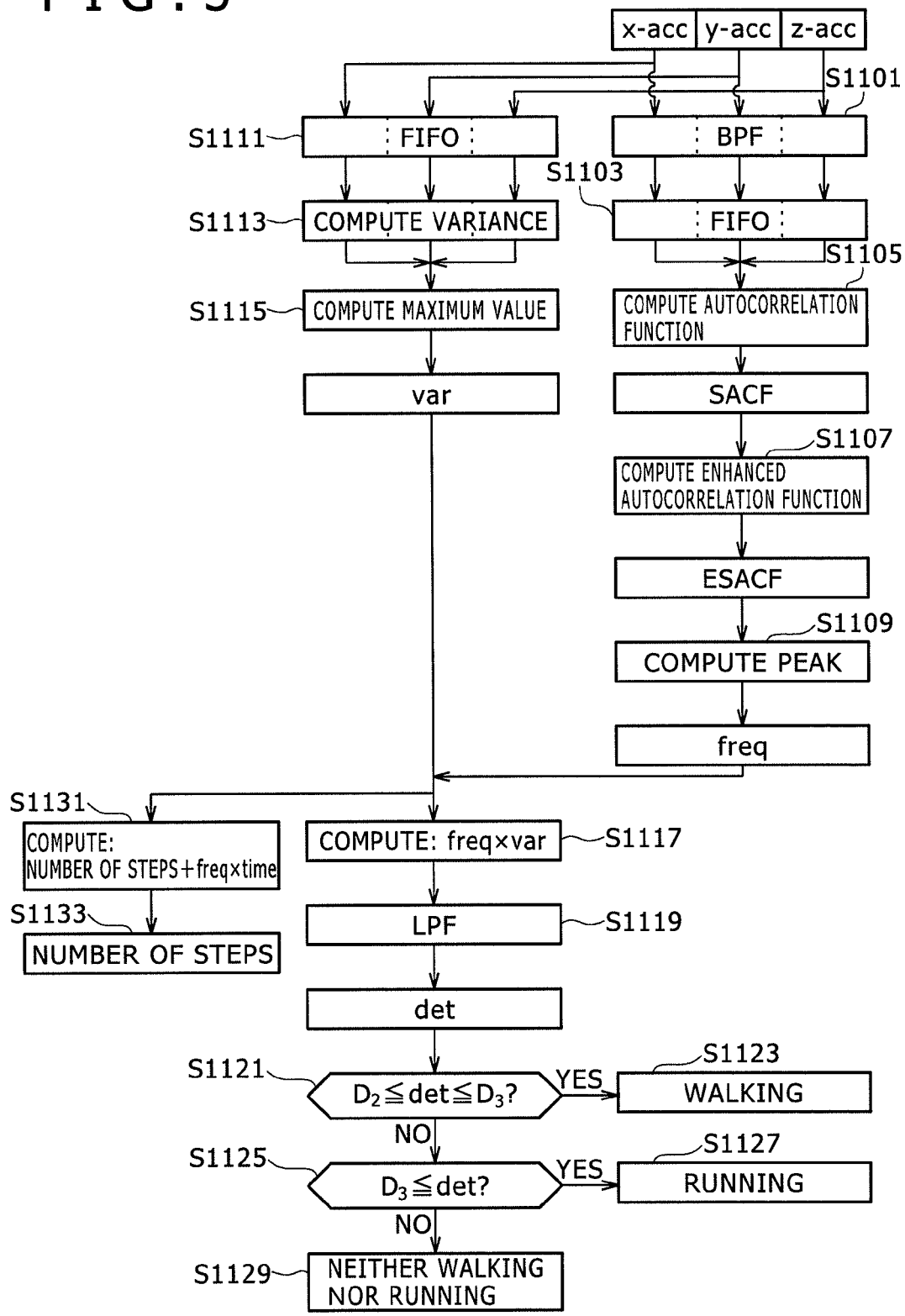

The following describes a method of recognizing whether the user is walking or running with reference to FIG. 5. FIG. 5 shows a method of recognizing whether the user is walking or running.

First, when the user moves, the corresponding sensor information is entered in the action pattern detection block 123. Here, the acceleration data (x-acc, y-acc, and z-acc) of three-dimensional directions are entered. When the sensor information is entered, the action pattern detection block 123 removes the frequency outside the frequency range in which the user is recognized to be walking or running from the acceleration data (x-acc, y-acc, and z-acc) by use of bandpass filter (BPF) (S1101). Next, the action pattern detection block 123 records the acceleration data (x-acc, y-acc, and z-acc) that has passed the BPF in the FIFO format (S1103).

Next, the action pattern detection block 123 reads the acceleration data (x-acc, y-acc, and z-acc) by a predetermined data amount recorded after the passing of the BPF to compute SACF (Summary Autocorrelation Function) (S1105) for the data that has been read. The time sequence of SACF peak corresponds to a periodical motion of the user that occurs during walking or running. However, SACF includes the harmonic component of the frequency corresponding to walking or running. Therefore, on the basis of a computed SACF, the action pattern detection block 123 computes an ESACF (Enhanced Summary Autocorrelation Function) (S1107). Next, the action pattern detection block 123 computes an autocorrelation peak on the basis of the ESACF (S1109) to obtain a walking/running evaluation frequency (freq).

In addition, the action pattern detection block 123 records the acceleration data (x-acc, y-acc, and z-acc) before passing the BPF in step S1101 in the FIFO format (S1111). Next, the action pattern detection block 123 reads the acceleration data (x-acc, y-acc, and z-acc) by a predetermined data amount to compute each variance (S1113). Then, the action pattern detection block 123 extracts the greatest variance from among the computed variances and outputs the extracted variance as a walking/running evaluation maximum variance (var) (S1115).

Next, the action pattern detection block 123 multiplies the above-mentioned waling/running evaluation frequency (freq) by the above-mentioned walking/running evaluation maximum variance (var) (S1117). The number of steps in a unit time is expressed by freq. The magnitude of motion is expressed by var. Further, on the basis of the number of steps and the magnitude of motion, the action pattern detection block 123 can determine whether the user is walking or running. Therefore, by determining whether a product between freq and var falls within the range of a predetermined area, the action pattern detection block 123 can determine whether the user is walking or running. First, in order to enhance the accuracy of this evaluation, the action pattern detection block 123 removes, from the product between freq and var, the frequency area in which the wrong recognition of walking or running is easy through the lowpass filter (LPF), thereby computing a walking/running evaluation data det (S1119).

Next, the action pattern detection block 123 determines whether the walking/running-state evaluation data is equal to or greater than minimum walking-state recognition value $D_2$ that is the lower-limit value in which the user is recognized to be walking and equal to or smaller than maximum walking-state recognition value $D_3$ that is the upper-limit value in which the user is recognized to be walking (S1121). If the walking/running-state evaluation data is found to be equal to or greater than $D_2$ and equal to or smaller than $D_3$, then the action pattern detection block 123 determines that the user is walking and enters the information indicative of walking into the text extraction block 131 (S1123). On the other hand, if not $D_2 \leq det \leq D_3$, then the action pattern detection block 123 goes to step S1125 to determine whether walking/running-state evaluation data det is equal to or greater than $D_3$ (S1125).

If the walking/running-state evaluation data is found to be greater than $D_3$, then the action pattern detection block 123 determines that the user is running and enters the information indicative of running into the text extraction block 131 (S1127). On the other hand, if the walking/running-state evaluation data is found to be smaller than $D_2$, then the action pattern detection block 123 determines that the user is neither walking nor running and enters the information indicative that the walking/running pattern is neither walking nor running into the text extraction block 131 (S1129). It should be noted that, by integrating freq, the information about the number of steps taken by the user in a time equivalent to an integration time can be obtained. Therefore, the action pattern detection block 123 computes the information about the number of steps (S1131) and enters the computed information into the text extraction block 131 (S1133).

Thus, by executing the evaluation processing in accordance with the example shown in FIG. 5, the recognition of a walking state, a running state, and a non-walking/non-running state can be achieved.

Method of Recognizing Jumping

Figure 6:
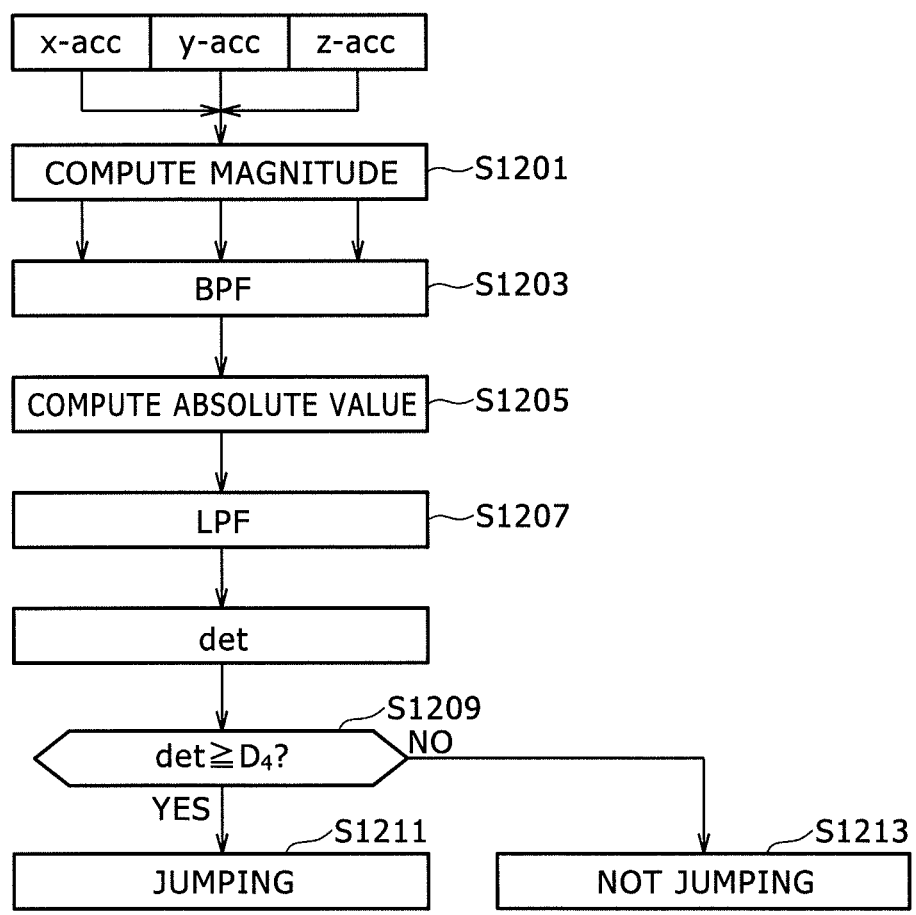

The following describes a method of recognizing whether the user is jumping or not with reference to FIG. 6. FIG. 6 shows a method of recognizing whether the user is jumping or not.

First, when the user moves, the corresponding sensor information is entered in the action pattern detection block 123. Here, the acceleration data (x-acc, y-acc, and z-acc) of three-dimensional directions are entered. When the sensor information is entered, the action pattern detection block 123 computes a jumping acceleration expressed by the magnitudes of x-acc, y-acc, and z-acc (S1201). Next, the action pattern detection block 123 removes, through the bandpass filter (BPF), the frequency outside the jumping-state recognition value area in which the user is recognized to be jumping (S1203). Next, the action pattern detection block 123 computes an absolute value of the value that has passed the BPF and outputs the computed absolute value as a corrected jumping acceleration (S1205). Taking the absolute value as described allows the removal of a noise component caused by the swing or vibration of the housing caused by user's jumping motion, as compared unlike the case of using jumping acceleration.

Next, the action pattern detection block 123 removes, through the lowpass filter (LPF), the frequency area in which jumping is easily recognized erroneously from the corrected jumping acceleration (S1207). Then, the action pattern detection block 123 computes a jumping-state evaluation value (det) for evaluating whether the user is jumping or not from the data that has passed the LPF. Next, the action pattern detection block 123 determines whether the jumping-state evaluation value is equal to or greater than minimum jumping-state recognition value $D_4$ that is the lower-limit value in which the user is recognized to be jumping (S1209). If the jumping-state evaluation value is found to be equal to or greater than minimum jumping-stage recognition value $D_4$, then the action pattern detection block 123 determines that the user is jumping and enters the information indicative of a jumping-state into the text extraction block 131 (S1211). On the other hand, if the jumping-state evaluation value is found to be smaller than the minimum jumping-state recognition value $D_4$, then the action pattern detection block 123 determines that the user is not jumping and enters the information indicative that the user is not jumping into the text extraction block 131 (S1213).

As described, executing the evaluation processing in accordance with the example shown in FIG. 6 allows the determination of a jumping-state or a non-jumping state.

Method of Recognizing Posture Change

Figure 7:
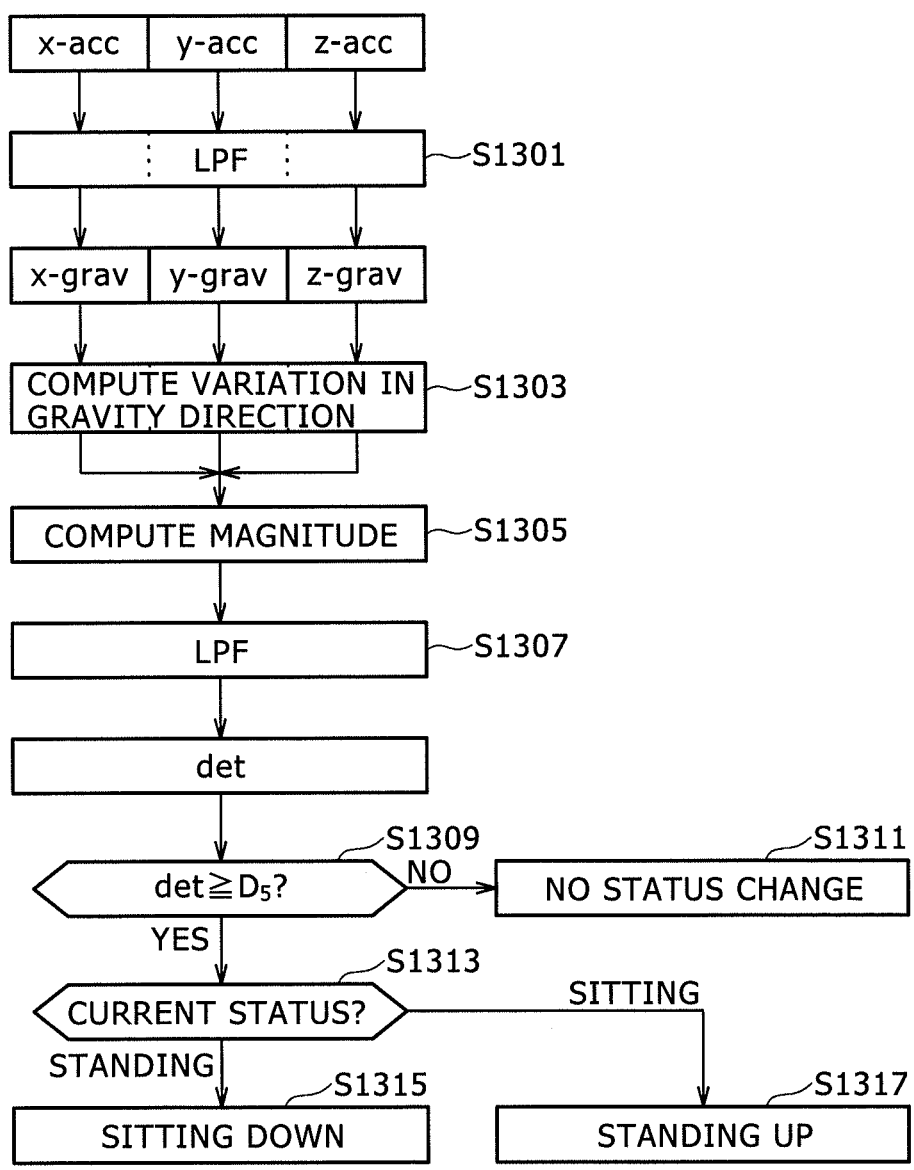

The following describes a method of recognizing whether the user is sitting or standing with reference to FIG. 7. FIG. 7 shows a method of recognizing whether the user is sitting or standing. It should be noted that the recognition of sitting or standing is the recognition that the sitting user stands up or the standing user sits down. Namely, this recognition concerns a posture change of the user.

First, when the user moves, the corresponding sensor information is entered in the action pattern detection block 123. Here, the acceleration data (x-acc, y-acc, and z-acc) of three-dimensional directions are entered. When the sensor information is entered, the action pattern detection block 123 removes, through the lowpass filter (LPF), the frequency area in which user posture changing is easily recognized erroneously from the acceleration data (x-acc, y-acc, and z-acc) (S1301). Then, on the basis of the acceleration data (x-acc, y-acc, and z-acc), the action pattern detection block 123 computes x-grav, y-grav, and z-grav, respectively. The x-gray, y-grav, and z-grav are gravity data indicative of directions in which gravity is applied.

Next, the action pattern detection block 123 computes value δ(x-grav) indicative of a change in x-grave, δ(y-grav) indicative of a change in y-grav, and δ(z-grav) indicative of a change in z-grav (S1303). Then, the action pattern detection block 123 computes posture changing values indicative of the magnitudes of δ(x-grav), δ(y-grav), and δ(z-grav) (S1305). Next, the action pattern detection block 123 removes, through the lowpass filter (LPF), the area in which user posture changing is erroneously recognized easily from the computed posture changing value (S1307) to compute a posture changing evaluation value (det) for determining whether a posture changing has occurred or not.

Next, the action pattern detection block 123 determines whether the posture changing evaluation value is equal to or greater than a minimum posture changing recognition value $D_5$ that is the lower-limit value in which the user is recognized to the changing in posture (S1309). If the posture changing evaluation value is found to be smaller than $D_5$, then the action pattern detection block 123 determines that there is no change in posture and enters the information indicative of no posture changing into the text extraction block 131 (S1311). On the other hand, if the posture changing threshold value is found to be equal to or greater than $D_5$, then the action pattern detection block 123 goes to step S1313 to determine whether the user is currently standing or sitting (S1313). If the user is found to be already standing, the action pattern detection block 123 determines that the user has sat down and enters the information indicative of sitting down into the text extraction block 131 (S1315). On the other hand, if the user is already sitting, the action pattern detection block 123 determines that the user has stood up and enters the information indicative of the standing up into the text extraction block 131 (S1317).

As described, executing the evaluation processing in accordance with the example shown in FIG. 7 allows the determination whether there occurred a change in user posture.

Method of Recognizing Going Up/Down by Elevator

Figure 8:
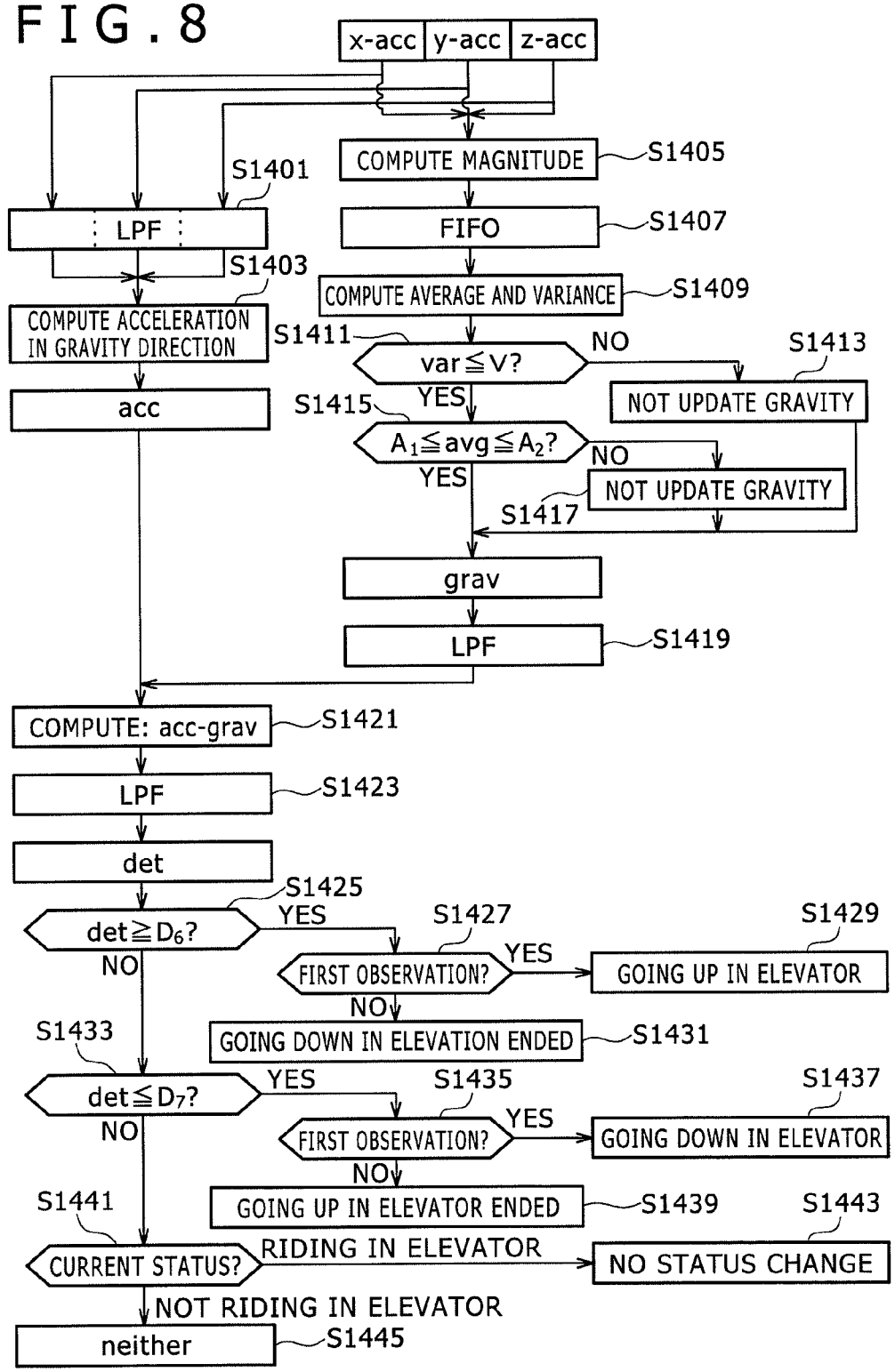

The following describes a method of recognizing whether the user is riding in an elevator or not with reference to FIG. 8. FIG. 8 shows a method of recognizing whether the user is riding in an elevator or not.

First, when the user moves, the corresponding sensor information is entered in the action pattern detection block 123. Here, the acceleration data (x-acc, y-acc, and z-acc) of three-dimensional directions are entered. When the sensor information is entered, the action pattern detection block 123 removes, through the lowpass filter (LPF), the frequency area in which a gravity direction acceleration is erroneously recognized easily on the basis of the acceleration data (x-acc, y-acc, and z-acc) (S1401). Next, the action pattern detection block 123 computes gravity direction acceleration sensor data (acc) on the basis of the acceleration data (x-acc, y-acc, and z-acc) that has passed the LPF (S1403).

In addition, in order to make the value of gravity adjustable, the action pattern detection block 123 computes gravity adjustment data expressed by the magnitude of acceleration data (x-acc, y-acc, and z-acc) and records the computed gravity adjustment data in the FIFO format (S1405, S1407). Next, the action pattern detection block 123 reads the gravity adjustment data by a predetermined data amount to compute a gravity adjustment variance (var) that is a variance of the gravity adjustment data (S1409). Further, the action pattern detection block 123 reads the gravity adjustment data by a predetermined data amount to compute gravity adjustment average data that is an average value of the gravity adjustment data (S1409).

Next, the action pattern detection block 123 determines whether the above-mentioned gravity adjustment variance is equal to or smaller than maximum allowable gravity variance V that is a maximum variance permitting gravity adjustment (S1411). If the above-mentioned gravity adjustment variance is found to be greater than V, then the action pattern detection block 123 does not update the gravity value (S1413). On the other hand, if the above-mentioned gravity adjustment variance is found to be equal to or smaller than maximum allowable gravity adjustment variance V, then the action pattern detection block 123 determines whether the above-mentioned gravity adjustment average data is equal to or greater than minimum allowable gravity average value $A_1$ that is a minimum average value permitting gravity adjustment and equal to or smaller than maximum allowable gravity average value $A_2$ that is a maximum average value permitting gravity adjustment (S1415).

If the above-mentioned gravity adjustment average data is found to be equal to or greater than $A_1$ and equal to or smaller than $A_2$, then the action pattern detection block 123 goes to step S1419. Otherwise, the action pattern detection block 123 does not update the gravity value (S1417). In step S1419, the action pattern detection block 123 removes, through the lowpass filter (LPF), the low area that is easily recognizable erroneously as gravity (S1419), thereby computing corrected gravity adjustment average data. Next, the action pattern detection block 123 computes a difference between the above-mentioned gravity direction acceleration sensor data and the above-mentioned corrected gravity adjustment average data (S1421). Next, from the computed difference, the action pattern detection block 123 removes a frequency area that is easily recognizable erroneously as that the user is riding in an elevator, thereby computing elevator up/down-state evaluation data (S1423).

Next, the action pattern detection block 123 determines whether the elevator up/down-state evaluation data is equal to or greater than a predetermined value $D_6$ (S1425). If the elevator up/down-state evaluation data is found to be equal to or greater than the predetermined value $D_6$, then the action pattern detection block 123 goes to step S1427. On the other hand, if the elevator up/down-state evaluation data is found to be smaller than predetermined value $D_6$, then action pattern detection block 123 goes to step S1433. It should be noted that the predetermined value $D_6$ is a lower-limit value in which starting of going up of the user in an elevator can be recognized.

In step S1427, the action pattern detection block 123 determines whether the elevator up/down-state evaluation data has exceeded predetermined value $D_6$ for the first time or not (S1427). If the elevator up/down-state evaluation data is found to have exceeded predetermined value $D_6$ for the first time, then the action pattern detection block 123 goes to step S1429 to determine that the user is going up in an elevator, thereby entering information indicative of the going up in an elevator into the text extraction block 131 (S1429). On the other hand, if the elevator up/down-state evaluation data is found to have exceeded the predetermined value $D_6$ not for the first time, then action pattern detection block 123 goes to step S1431 to determine that going down in an elevator has ended, thereby entering information indicative of the end of going down in an elevator into the text extraction block 131 (S1431).

In step S1433, the action pattern detection block 123 determines whether the elevator up/down-state evaluation data is equal to or smaller than a predetermined value $D_7$ (S1433). It should be noted that the predetermined value $D_7$ is an upper-limit value in which starting of going down of the user in an elevator can be recognized. If the elevator up/down-state evaluation data is found to be equal to or smaller than the predetermined value $D_7$, the action pattern detection block 123 goes to step S1435. On the other hand, if the elevator up/down-state evaluation data is found to be greater than the predetermined value $D_7$, then the action pattern detection block 123 goes to step S1441.

In step S1435, the action pattern detection block 123 determines whether the elevator up/down-state evaluation data has gone below predetermined value $D_7$ for the first time or not (S1435). If the elevator up/down-state evaluation data is found to have gone below the predetermined value $D_7$ for the first time, the action pattern detection block 123 goes to step S1437 to determine that the user is going down in an elevator, thereby entering information indicative of going down of the user in an elevator into the text extraction block 131 (S1437). On the other hand, if the elevator up/down-state evaluation data is found to have gone below the predetermined value $D_7$ not for the first time, then the action pattern detection block 123 determines that the going up of the user in an elevator ended, thereby entering information indicative of the end of going up of the user in an elevator into the text extraction block 131 (S1439).

In step S1441, the action pattern detection block 123 determines whether the user is currently riding in an elevator or not (S1441). If the user is found to be currently riding in an elevator, then the action pattern detection block 123 goes to step S1443 to determine that the elevator is not in an acceleration or deceleration state, thereby entering the information indicative that the elevator is not in an acceleration or deceleration state into the text extraction block 131 (S1443). On the other hand, if the user is found to be not riding in an elevator, then the action pattern detection block 123 goes to step S1445, thereby entering the information indicative that the user is not riding in an elevator into the text extraction block 131 (S1445).

As described above, executing the evaluation processing in accordance with the example shown in FIG. 8 allows the determination whether the user is riding up or down in an elevator or not.

Method of Recognizing Whether the User is Riding in a Train

Figure 9:
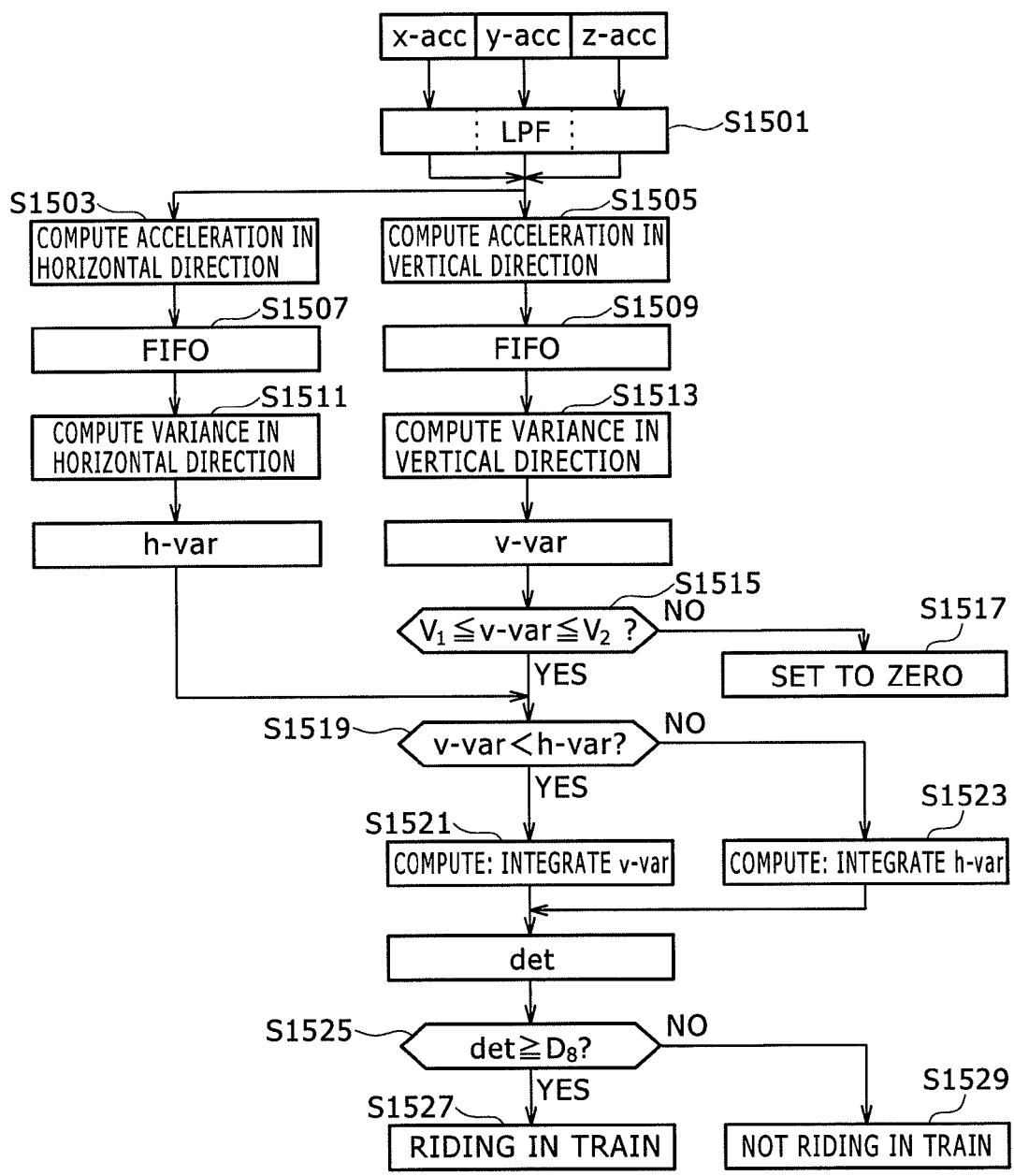

The following describes a method of recognizing whether the user is riding in a train or not with reference to FIG. 9. FIG. 9 shows a method of recognizing whether the user is riding in a train or not.

First, when the user moves, the corresponding sensor information is entered in the action pattern detection block 123. Here, the acceleration data (x-acc, y-acc, and z-acc) of three-dimensional directions are entered. When the sensor information is entered, the action pattern detection block 123 removes, through the lowpass filter (LPF), a frequency area that is easily recognizable erroneously that the user is riding in a train on the basis of the acceleration data (x-acc, y-acc, and z-acc) (S1501). Next, on the basis of the acceleration data (x-acc, y-acc, and z-acc) with the above-mentioned frequency area removed, the action pattern detection block 123 computes acceleration data in the horizontal direction and the vertical direction (S1503, S1505). It should be noted that the horizontal direction and the vertical direction denote the directions relative to the ground on which the train is traveling.

Next, the action pattern detection block 123 records the above-mentioned horizontal direction acceleration data and the above-mentioned vertical direction acceleration data by a predetermined data mount each in FIFO format (S1507, S1509). Then, the action pattern detection block 123 reads the horizontal direction acceleration data by a predetermined data amount to compute a horizontal direction variance (h-var) that is the variance of the horizontal direction acceleration data (S1511). Also, the action pattern detection block 123 reads the vertical direction acceleration data by a predetermined data amount to compute a vertical direction variance (v-var) that is the variance of the vertical direction acceleration data (S1513). The horizontal direction variance (h-var) is indicative of the degree of horizontal swinging or vibration that is detected when the train is running. The vertical direction variance (v-var) is indicative of the degree of vertical swinging or vibration that is detected when the train is running.

Next, the action pattern detection block 123 determines whether the vertical direction variance (v-var) is equal to or greater than a minimum allowable vertical variance $V_1$ that is a minimum allowable vertical direction variance and equal to or smaller than a maximum allowable vertical variance $V_2$ that is a maximum allowable vertical direction variance (S1515). If the vertical direction variance (v-var) is found to be smaller than $V_1$ or greater than $V_2$, then the action pattern detection block 123 sets train ride evaluation data (det) to 0 (S1517). On the other hand, if the vertical direction variance is found to be equal to or greater than $V_1$ and equal to or smaller than $V_2$, then the action pattern detection block 123 goes to step S1519.

In step S1519, the action pattern detection block 123 determines which is smaller, the vertical direction variance or the horizontal direction variance (S1519). If vertical direction variance (v-var) is found to be smaller, then the action pattern detection block 123 integrates vertical direction variance (v-var) by a predetermined data amount to compute an integration value (S1521). On the other hand, if horizontal direction variance (h-var) is found to be smaller, then the action pattern detection block 123 integrates horizontal direction variance (h-var) by a predetermined data amount to compute an integration value (S1523). Then, the integration values obtained in steps S1521 and S1523 are set to train ride evaluation data (det) that is used for determining whether the user is riding in a train or not.

Next, the action pattern detection block 123 determines whether the train ride evaluation data is equal to or greater than a minimum train ride recognition value $D_8$ that is the lower-limit value in which the user is recognized to be riding in a train (S1525). If the train ride evaluation data is found to be equal to or greater than $D_8$, then the action pattern detection block 123 determines that the user is riding in a train, thereby entering information indicative that the user is riding in a train into the text extraction block 131 (S1527). On the other hand, if the train ride evaluation data is found to be smaller than $D_8$, then the action pattern detection block 123 determines that the user is not riding in a train, thereby entering the information indicative that the user is not riding in a train into the text extraction block 131 (S1529).

As described above, executing the evaluation processing in accordance with the example shown in FIG. 9 allows the determination whether the user is riding in a train or not. By considering running states of a train, namely, an acceleration state through a deceleration state, the action pattern detection block 123 can determine that the user is riding in a train that is stopping at a station, the user is riding in a train that comes to a stop, the user gets out of a train that has arrived at a station and the user started walking from the train, and other states. These evaluation results may be supplied to the text extraction block 131 in configuration.

Method of Recognizing Right-Turn/Left-Turn

Figure 10:
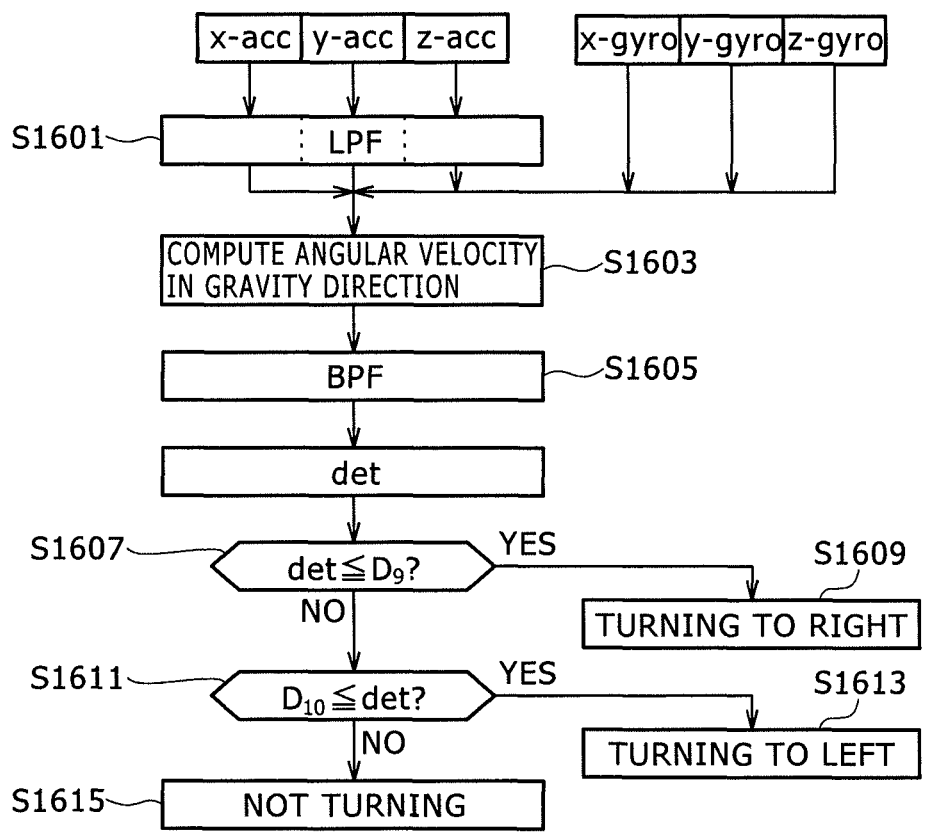
FIG. 10 is a flowchart indicative of one example of an action pattern detection method.

The following describes a method of recognizing whether the user has turned left or right with reference to FIG. 10. FIG. 10 shows a method of recognizing whether the user has turned left or right.

First, when the user moves, the corresponding sensor information is entered in the action pattern detection block 123. Here, the acceleration data (x-acc, y-acc, and z-acc) of three-dimensional directions and the three-dimensional gyro data (x-gyro, y-gyro, and z-gyro) are entered. When the sensor information is entered, the action pattern detection block 123 removes, through the lowpass filter (LPF), a frequency area easily recognizable erroneously that the user is turning left or right from the entered sensor information (S1601). Next, the action pattern detection block 123 computes an angular velocity in the gravity direction on the basis of the acceleration data (x-acc, y-acc, and z-acc) of three-dimensional directions and the three-dimensional gyro data (x-gyro, y-gyro, and z-gyro) with the above-mentioned frequency area removed (S1603).

Next, the action pattern detection block 123 removes, through the bandpass filter (BPF), a value outside of a turning recognition area for recognizing that the user is turning left or right from the computed angular velocity, thereby computing a corrected angular velocity (det) (S1605). Then, the action pattern detection block 123 determines whether the corrected angular velocity is equal to or smaller than a maximum right turn recognition value $D_9$ that is the upper-limit value for recognizing that the user is turning right (S1607). If the angular velocity is found to be equal to or smaller than $D_9$, then the action pattern detection block 123 determines that the user is turning right and enters the evaluation result into the text extraction block 131 (S1609). On the other hand, if the angular velocity is found to be greater than $D_9$, then the action pattern detection block 123 goes to step S1611.

In step S1611, the action pattern detection block 123 determines whether the corrected angular velocity is equal to or greater than a minimum left turn recognition value $D_{10}$ that is the lower-limit value for recognizing that the user is turning left (S1611). If the angular velocity is found to be equal to or greater than $D_{10}$, then the action pattern detection block 123 determines that the user is turning left and enters the information indicative that the user is turning left into the text extraction block 131 (S1613). On the other hand, if the angular velocity is found to be smaller than $D_{10}$, then the action pattern detection block 123 determines that the user is not turning left or right and enters the evaluation result into the text extraction block 131 (S1615).

As described above, executing the evaluation processing in accordance with the example shown in FIG. 10 allows the determination whether the user is turning right or left.

The details of the functions of the action pattern detection block 123 have been described. As described above, the motion and state patterns are not indicative of user's specific live behaviors. The motion and state patterns herein denote a state of the user at a point of time (or a relatively short time).

Now, returning to FIG. 2, the configuration of the text selection section 103 associated with the first embodiment will be described. The positional information analysis block 125 is realized by a CPU, a ROM, a RAM, and so on, for example. The positional information analysis block 125 outputs positional information entered from the sensor information acquisition section 101 to the text extraction block 131 to be described later. Also, the positional information analysis block 125 analyzes positional information by use of the positional information output from the sensor information acquisition section 101 and the user action log information 133 stored in the storage section 111.

To be more detail, the positional information analysis block 125 updates the log of positional information that is a type of user action log information by use of the entered positional information. In doing so, the positional information analysis block 125 relates user-unique identification information (user ID) with the entered positional information to update the log of the positional information. Also, if a combination of longitude and latitude written to the entered positional information is indicative of a new place, then the positional information analysis block 125 may relate the identification information (place ID) unique to that place information with the corresponding positional information to record these pieces of information. Further, the positional information analysis block 125 may refer to the information about the date related with the positional information to identify a time zone in which the written time is included, thereby relating the identification information (time zone ID) corresponding to that time zone to record these pieces of information.

Further, by use of the entered positional information and the log of the positional information, the positional information analysis block 125 analyzes a place to be frequently visited or a place to be visited after the current position. The analysis of a place to be frequently visited is executed by computing the frequency of user's visiting to each of places written to the positional information log, thereby determining a score on the basis of the computed frequency, for example.

The analysis of a place to be visited next is executed by computing a conditional probability of user's moving from the current position to each of places written to the positional information log, thereby determining a score on the basis of the obtained conditional probability, for example. The larger the values of these scores, the surer the corresponding events.

Referring to FIG. 11, there is shown an example of the user action log information 133 stored in the storage section 111 associated with the first embodiment of the invention. The user action log information 133 stores the positional information log and the information generated by various processing operations executed by the positional information analysis block 125. Each of the processing blocks of the text selection section 103 is able to refer to this user action log information 133 in executing the processing of each processing block.

The text analysis block 127 is realized by a CPU, a ROM, a RAM, a communication apparatus, and so on, for example. The text analysis block 127 analyzes each type of text stored in a text database (hereafter referred to as a text DB) stored in the storage section 111. The analysis by the text analysis block 127 assigns an attribute to each word included in a text (or a sentence) and, at the same time, a motion and a state (a context) expressed by the text to the text itself. This analysis processing makes it clear when each text is used (a context) and what each word in a text points (a word attribute).

First, the text analysis block 127 obtains each text stored in the text DB 135 and executes so-called morphological analysis on the obtained text. In executing morphological analysis, the text analysis block 127 uses various dictionaries included in the text analysis database (hereafter referred to as a text analysis DB) 137 stored in the storage section 111. Consequently, the text is resolved into one or more words that constitute the text. The text selection section 103 associated with the first embodiment handles these words generated as described above as keywords. In addition, the text analysis block 127 refers to the dictionaries for use in morphological analysis to assign an attribute to each word. It should be noted that, in addition to morphological analysis, the text analysis block 127 may execute structural analysis or semantic analysis on texts as required.

It should also be noted that, depending on words, various attributes may be assigned to one word. For example, word "Ebisu" is the name of a place in Tokyo, the name of Japanese gods (one of the Seven Auspicious Gods), and the name of a railroad station. As with this example, the text analysis block 127 assigns two or more attributes to a word rather than only one attribute when two or more attributes are assignable. Consequently, the text analysis block 127 is able to grasp one word in a multifaceted manner.

When an attribute is assigned to a word constituting a text, the text analysis block 127 assigns a context (a motion or a state expressed by a text) of a text by use of the assigned attribute. In this case also, the text analysis block 127 assigns two or more contexts to a word rather than only one context when two or more contexts are assignable. Consequently, the text analysis block 127 grasps a context of one sentence in a multifaceted manner.

When the resolution of a text into words and the subsequent assignment of attribute and context have been completed, the text analysis block 127 executes the scoring of a combination of each word (namely, a keyword) and attribute and the scoring of context. Consequently, the probability of an attribute for each word included in a text and the probability of a context can be put in numeral forms.

The text analysis processing mentioned above executed by the text analysis block 127 is executed with a given timing. For example, when an unanalyzed text is added to the text DB 135 or the like, the text analysis block 127 may execute the text analysis processing described above. Also, the text analysis block 127 may extract an unanalyzed text at certain intervals (once a day for example) and execute the text analysis processing mentioned above on the extracted unanalyzed text.

The following specifically describes the text analysis processing to be executed by the text analysis block 127 with reference to FIG. 12 through FIG. 16. FIG. 12 through FIG. 16 are diagrams for explaining the text analysis processing to be executed by the text analysis block 127.

Figure 12:
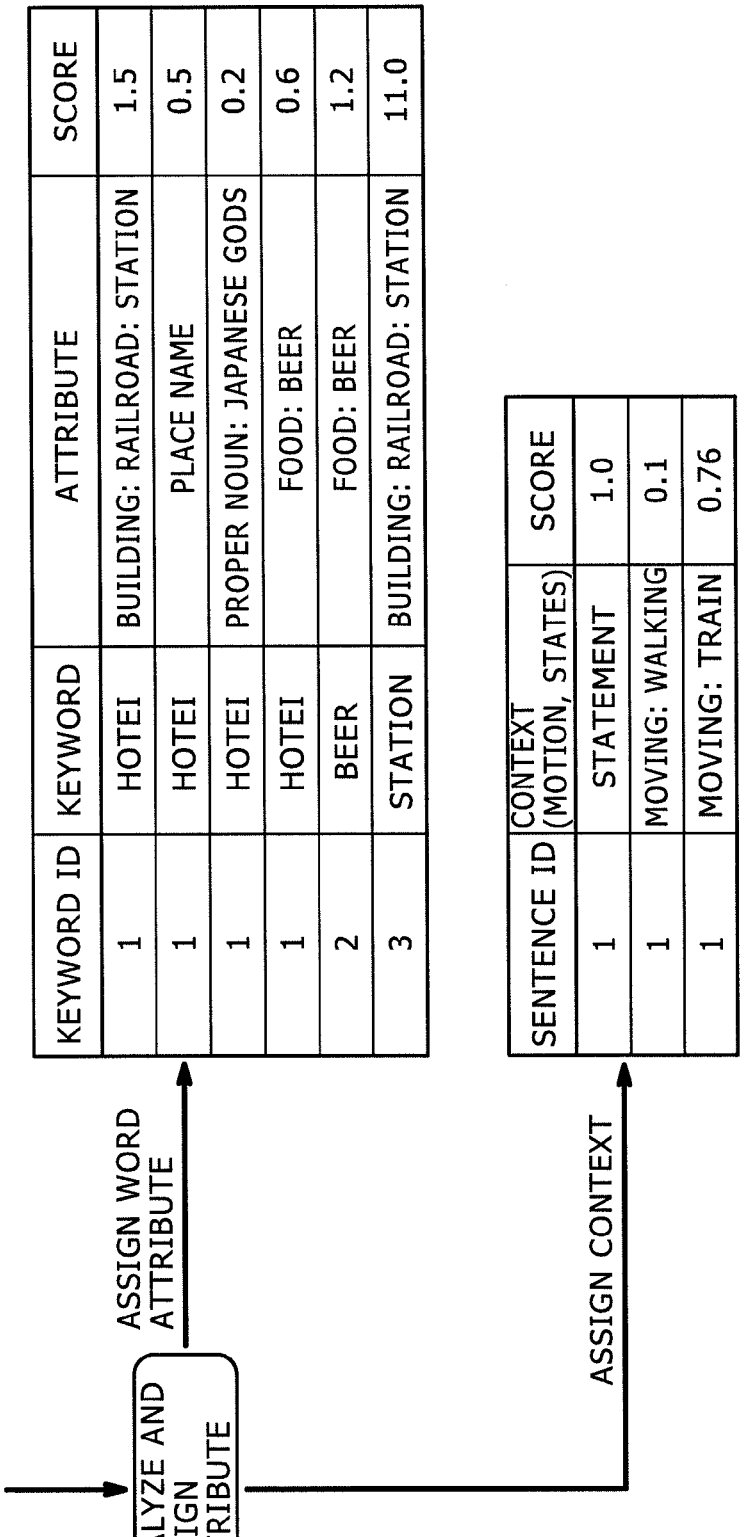

First, referring to FIG. 12, there is shown an outline of the text analysis processing to be executed by the text analysis block 127. In the example shown in FIG. 12, the text analysis block 127 executes text analysis processing on a text (or sentence) "In the Hotei station area, there was a beer factory in the past."

In this case, the text analysis block 127 executes morphological analysis on a sentence in attention to divide the sentence into two or more words. In the example shown in FIG. 12, the sentence in attention is divided into nouns "Hotei," "station," "area," "past," "beer," "factory," and a verb "be," and a preposition "in," and articles "a" and "the," and an adverb "there." The text analysis block 127 assigns identification information (keyword ID) to these keywords and, on the basis of referred dictionaries and so on, attributes to these keywords. In the example shown in FIG. 12, keyword "Hotei" is assigned with attributes "building: railroad: station," "place name," "proper noun: Japanese gods," and "food: beer." As shown in FIG. 12, attributes to be assigned may be related with superordinate concepts, such as "railroad" and "building," in addition to a subordinate concept, such as "station." In addition, the text analysis block 127 computes a score for each combination of keyword and attribute and relates the computed score with a corresponding combination.

Further, the text analysis block 127 assigns identification information (sentence ID) unique to each sentence in attention and, at the same time, assigns a context considered to correspond to the sentence in attention. In the example shown in FIG. 12, contexts, such as "statement," "moving: walking," and "moving: train," are assigned to a sentence in attention and a score is computed for each context. As shown in FIG. 12, a superordinate concept, such as "moving," may be related with each context in addition to subordinate concepts, such as "walking" and "train."

Figure 13A:
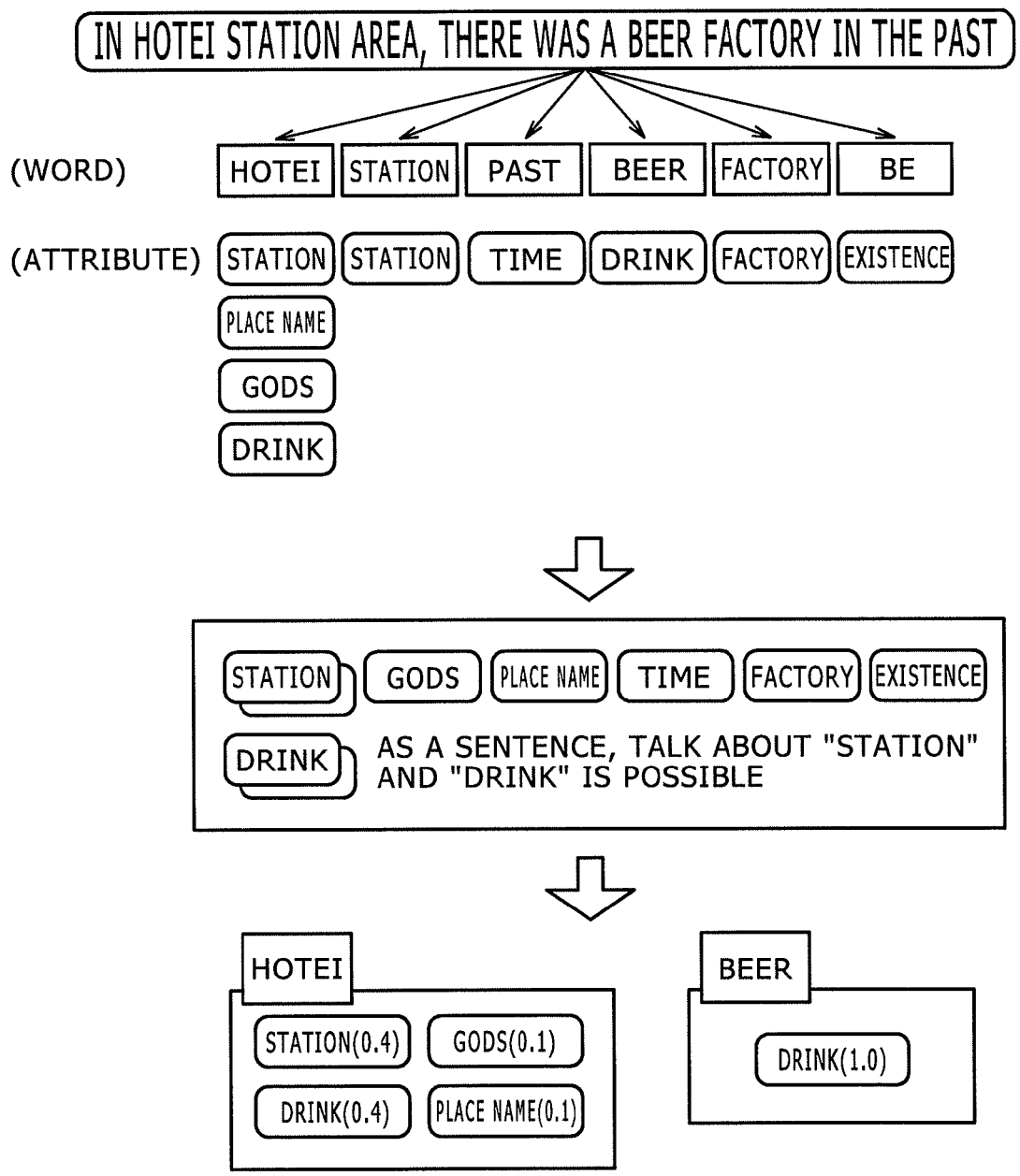
Figure 13B:
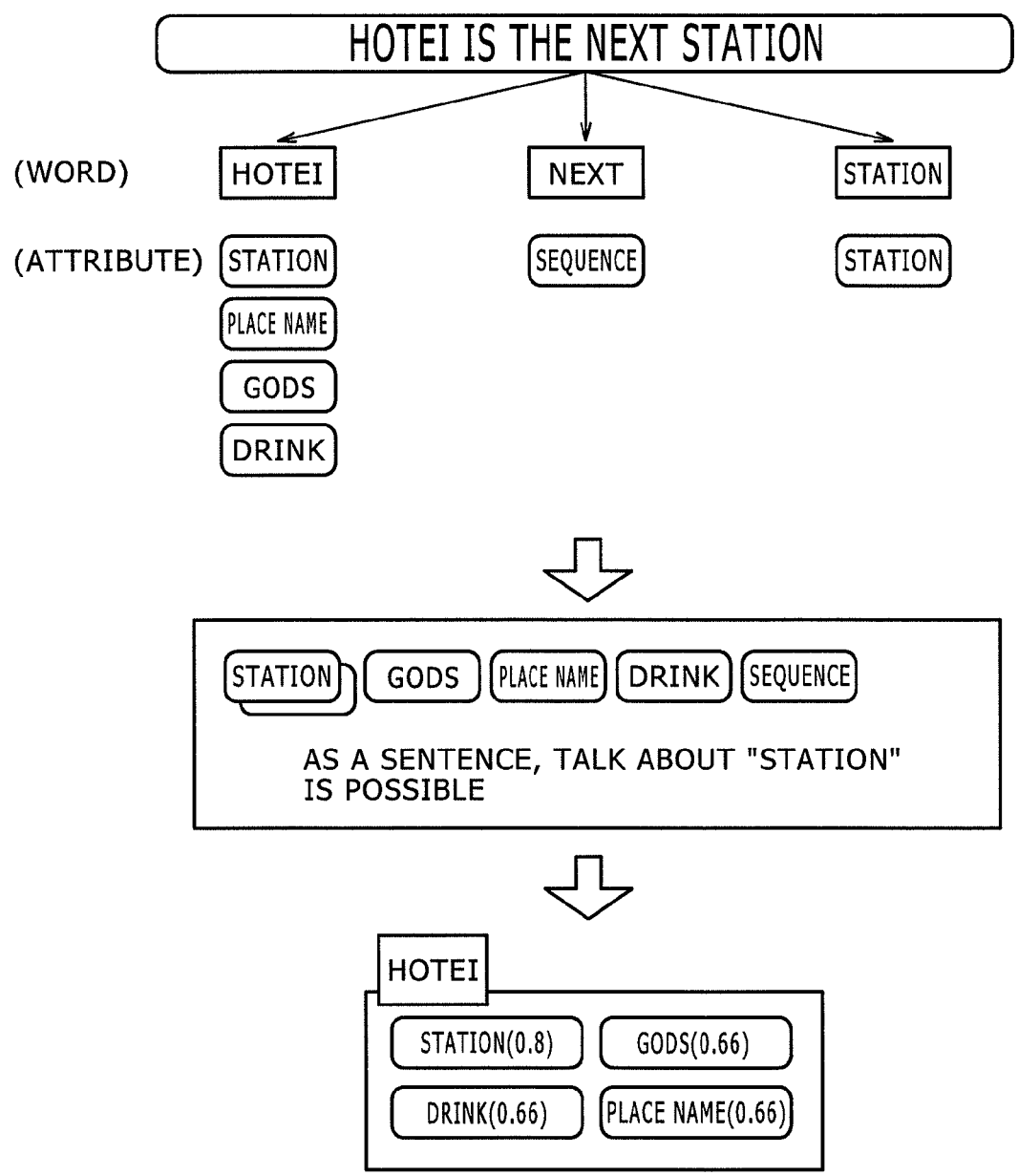

FIG. 13A and FIG. 13B show methods of estimating attributes of an entire text on the basis of the frequency of the attribute of each word existing in the text to determine the likelihood of the attribute of each word for the words constituting the text.

In the example shown in FIG. 13A, the case with attention placed on sentence "In the Hotei station area, there was a beer factory in the past" is used. The text analysis block 127 executes morphological analysis on the sentence in attention to divide the sentence into morphemes "Hotei," "station," "area," "past," "beer," "factory," and "be." In addition, by referencing dictionaries stored in a text analysis DB 137, the text analysis block 127 assigns four types of attributes "station," "place name," "gods," and "drink" to "Hotei" and, at the same time, assigns attributes also to each word in the same manner.

With the entire sentence in attention, attributes "station" and "drink" exist in two each and the other attributes in one each. Therefore, in the entire sentence, it can be determined that it is highly possible for the sentence in attention to be about "station" and "drink." Therefore, on the basis of this evaluation result, the text analysis block 127 can compute a score for each of keyword attributes. In the example shown in FIG. 13A, scores "station (score: 0.4)," "drink (score: 0.4)," "gods (score: 0.1)," and "place name (score: 0.1)" are assigned to keyword "Hotei."

In the example shown in FIG. 13B, sentence "Hotei is the next station" is analyzed. With this sentence, the text analysis block 127 executes analysis in the same manner as with the example shown in FIG. 13A, thereby determining that it is highly possible for the sentence to be about "station." Therefore, on the basis of this evaluation result, the text analysis block 127 can compute a score for each of keyword attributes. In this example shown in FIG. 13B, scores "station (score: 0.8)," "drink (score: 0.66)," "gods (score: 0.66)," and "place name (score: 0.66)" are assigned to keyword "Hotei."

As shown in FIG. 13A and FIG. 13B, the scores computed for attributes are different from sentence to sentence in attention.

In the example shown in FIG. 14, a collection having a large amount of sentences is analyzed in advance to generate a cluster of words constituting a sentence and a word cluster thus generated is used to assign word attributes. In this case, the text analysis block 127 determines to which cluster of the word clusters each of two or more words obtained as a result of morphological analysis belongs. For example, word "Hotei" shown in FIG. 14 belongs to cluster "gods" to which word "Fukurokuju" belongs, cluster "drink" to which drink maker name "Karin" belongs, and cluster "station." In such a case, the text analysis block 127 may regard that the activity in clusters "station" and "drink" is high, thereby assigning "station" and "drink" as attributes of "Hotei."

It should be noted that the methods of assigning attributes to words are not limited to those shown above; other methods are also available. Further, if there are sentences before and after a sentence in attention, forming a sequence of sentences associated with each other, the text analysis block 127 may use the analysis results of associated sentences to assign attributes to words.

Figure 15:
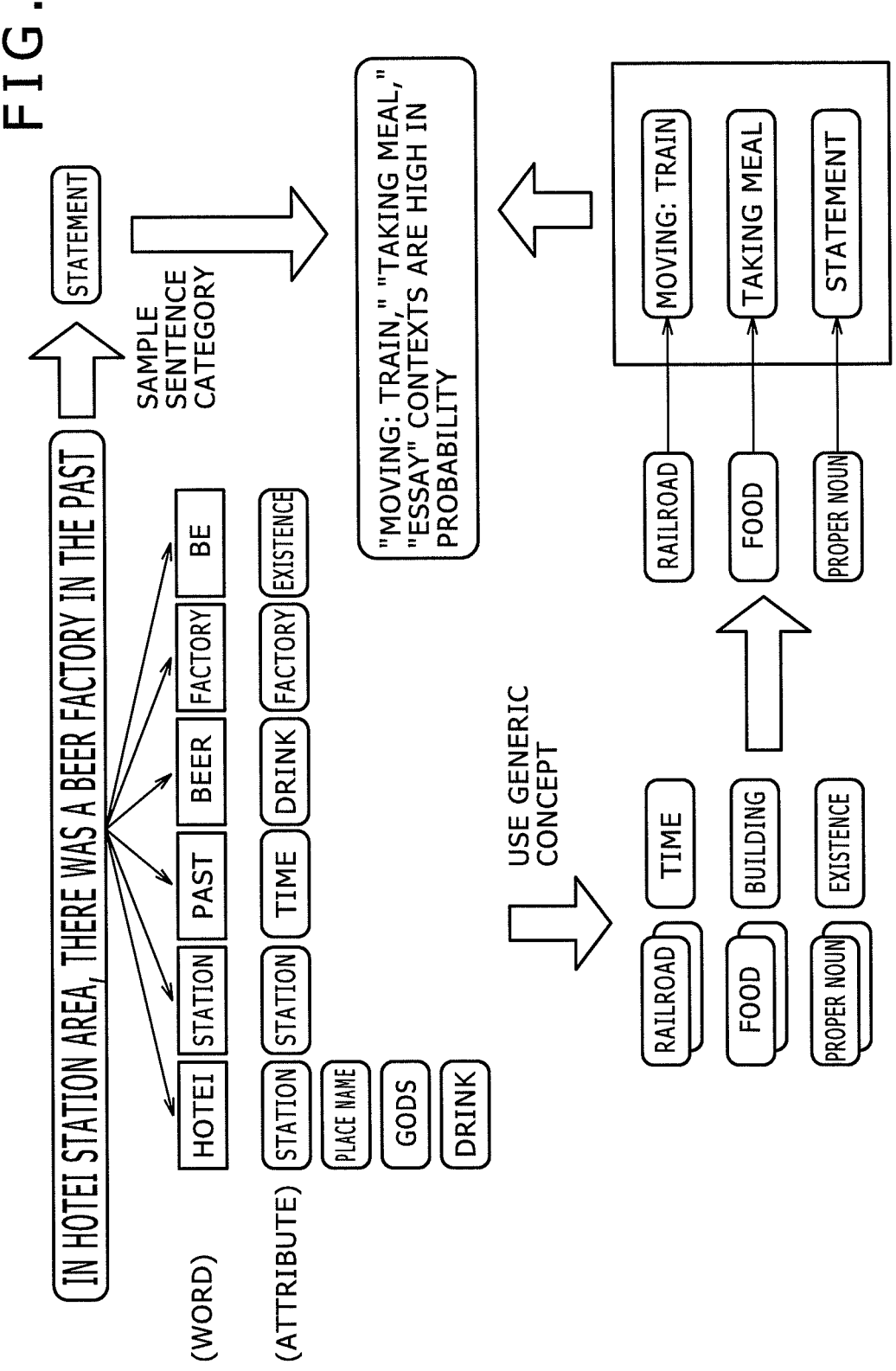

The following describes methods of assigning a context to a text with reference to FIG. 15 and FIG. 16. FIG. 15 and FIG. 16 show methods of assigning a context to a text associated with the first embodiment of the invention.

Referring to FIG. 15, there is shown a method of assigning a context to a text by use of an attribute frequency in a sentence and a dictionary file stored in the text analysis DB 137.

In the example shown FIG. 15, the case with attention placed on sentence "In the Hotei station area, there was a beer factory in the past" is used. In this method, if a certain classification category is set to a text in attention, the text analysis block 127 uses this classification category. In the example shown in FIG. 15, category "statement" is set to sample sentence "In the Hotei station area, there was a beer factory in the past" in advance, so that the text analysis block 127 uses this classification category (or the sample sentence category). It should be noted that category "statement" is a classification category that is assigned to a text (or a sentence) describing something.

In addition, the text analysis block 127 executes morphological analysis on the text in attention in the method described above, thereby assigning an attribute to a word (or a keyword) existing in the text. On the basis of this assignment, the text analysis block 127 refers to a dictionary file stored in the text analysis DB 137 to extract the superordinate concept for the assigned attribute. It should be noted that, if there is no superordinate concept for the assigned attribute, the assigned attribute is used as it is.

In the example shown in FIG. 15, analyzing the text assigns attributes "station," "place name," "gods," "drink," "time," "factory," and "existence." The text analysis block 127 changes attributes for which superordinate concept exists by use of assigned attributes and the dictionary file to extract attributes "railroad," "food," "proper noun," "time," "building," and "existence."

Subsequently, the text analysis block 127 identifies a context from the extracted attributes (of superordinate concept) by use of a mapping table that lists the correlation between attribute and context stored in the text analysis DB 137 or the like. In the example shown in FIG. 15, the attribute of superordinate concept "railroad" is related with context "moving: train" by use of the mapping table. Likewise, the attribute of superordinate concept "food" is related with context "taking meal" and the attribute of superordinate concept "proper noun" is related with context "statement."

The text analysis block 127 determines the context of a text in attention by use of the context related by the mapping table and a sample sentence category of the text in attention if any. For example, in FIG. 15, the text analysis block 127 determines, from the comparison of both, that the probability of context "moving: train," "taking meal," and "statement" is high.

Consequently, the text analysis block 127 determines that the sentence context of the text in attention is "moving: train," "taking meal," and "statement."

On the other hand, in the example shown in FIG. 16, while learning a context set by a user through the condition setting block 121 or the like, the text analysis block 127 records a log of sentences used under a preset context condition. In the example shown in FIG. 16, as seen from the log information (or usage log) as shown in the figure, sentence X is often used in context "moving: train." Therefore, the text analysis block 127 determines that it is probable that sentence X in attention is context "moving: train." Thus, the example shown in FIG. 16 is a method of determining the context of a sentence in attention by machine learning the log of context and feeding back an obtained learning result.

It should be noted that the method based on the feedback technique shown above may be used along with other sentence context assigning methods.

It should also be noted that a text on which analysis is executed by the text analysis block 127 is not limited to those recorded to the text DB 135. The text analysis block 127 is able to analyze texts recorded to an externally connected device or a removable recording media connected to the information processing apparatus 10 or texts stored in various devices connected to the Internet or a home network, for example.

If various keywords are entered from the keyword conversion block 129, the text analysis block 127 executes analysis processing on the entered keywords and assigns attributes corresponding to the analyzed keywords. When attribute assignment to keywords is completed, the text analysis block 127 outputs the information indicative of the attributes assigned to keywords to the keyword conversion block 129.

The execution of the above-mentioned processing builds the text DB 135 as shown in FIG. 17. As shown in FIG. 17, the text DB 135 stores the information associated with stored sentences, the information associated with extracted keywords, the information associated with the correlation between sentence and keyword, and so on.

For example, the information associated with sentences contains the information associated with texts stored in the text DB 135. This information contains sentence-unique identification information (sentence ID), the information indicative of sentence type, the information indicative of sentence itself, the information associated with the level indicative of the degree of difficulty of sentence, and the identification information (language ID) indicative of language type. Each sentence is related with identification information (related sentence ID) indicative of related sentences.

The text extraction block 131 to be described later is able to correctly extract texts suited to user's current position or action pattern by use of the text DB 135 described above.

The keyword conversion block 129 is realized by a CPU, a ROM, a RAM, a communication apparatus, and so on, for example. The keyword conversion block 129 converts positional information output from the sensor information acquisition section 101 into a keyword associated with a place indicated by this positional information. This keyword conversion can be executed by use of various dictionaries and databases stored in the text analysis DB 137 or various servers that control network search engines, for example. By executing this keyword conversion processing, the keyword conversion block 129 can obtain various keywords, such as address, place name, names of nearby buildings, roads, and shops, and so on.

In addition, the keyword conversion block 129 may refer not only to the positional information supplied from the sensor information acquisition section 101 but also to the user action log information 133 analyzed and updated by the positional information analysis block 125 to execute the keyword conversion processing on places frequently visited or places to be visited next, for example. Consequently, keywords associated with places to be visited by the user and associable with the place indicated by the positional information supplied from the sensor information acquisition section 101 can be obtained.

The keyword conversion block 129 outputs the keywords thus obtained to the text analysis block 127 to request the text analysis block 127 for assigning attributes to the obtained keywords. At the same time, if attributes are assigned to the converted keywords, the keyword conversion block 129 outputs the keywords assigned with attributes to the text extraction block 131.

The text extraction block 131 is realized by a CPU, a ROM, a RAM, and so on, for example. On the basis of the context output from the action pattern detection block 123, the positional information output from the positional information analysis block 125, and the keywords output from the keyword conversion block 129, the text extraction block 131 extracts a proper text from the two or more texts stored in the text DB 135. In text extraction, the text extraction block 131 also considers various conditions set by the condition setting block 121.

To be more specific, on the basis of the entered context, setting conditions, keywords, attributes, and so on, the text extraction block 131 executes matching with the texts (and attributes and context assigned to the texts) stored in the text DB 135. On the basis of this matching, the text extraction block 131 presents a text most suited to the entered conditions and so on to the user as a user presentation text. Consequently, a sentence most suited to user's current position or state (context) is presented to the user, enabling the user to refer to the sentence that provides the higher sense of presence.

It should be noted that, in text extraction, a sentence may be extracted that matches in attribute but mismatches in keyword, for example. If this happens, the text extraction block 131 may appropriately replace a keyword in the extracted text by an attribute-matching keyword entered from the keyword conversion block 129. This keyword replacing enables the presentation of a sentence having the higher sense of presence to the user.

It should also be noted that, in the above description, text extraction processing is executed on the basis of positional information, information derived from positional information, conditions set by the condition setting block 121, and user states (or a context) detected by the action pattern detection block 123. However, if the text selection section 103 has no action pattern detection block 123, the text extraction processing may be executed on the basis of positional information, information derived from positional information, and conditions set by the condition setting block 121.

Thus, one example of the functions of the information processing apparatus 10 associated with the first embodiment of the invention has been described. Each of the above-mentioned component elements may be configured by a general-purpose member for a circuit or a hardware device dedicated to the function of each component element. The function of each component element may all be carried out by a CPU and so on, for example. Therefore, the configuration to be used may be appropriately changed in accordance with technological levels valid at the time of practicing the present embodiment.

It is practicable to write a computer program for realizing each of the functions of the information processing apparatus practiced as the first embodiment of the invention and install the written computer program in a personal computer or the like, for example. In addition, a computer-readable recording media storing such computer programs may be provided. This recording media may include a magnetic disk, an optical disk, a magneto-optical disk, and a flush memory, for example. Also, the above-mentioned computer program may be distributed through networks for example, rather than in a recording media.

(1-2) Processing Flow of Information Processing Methods

Figure 18:
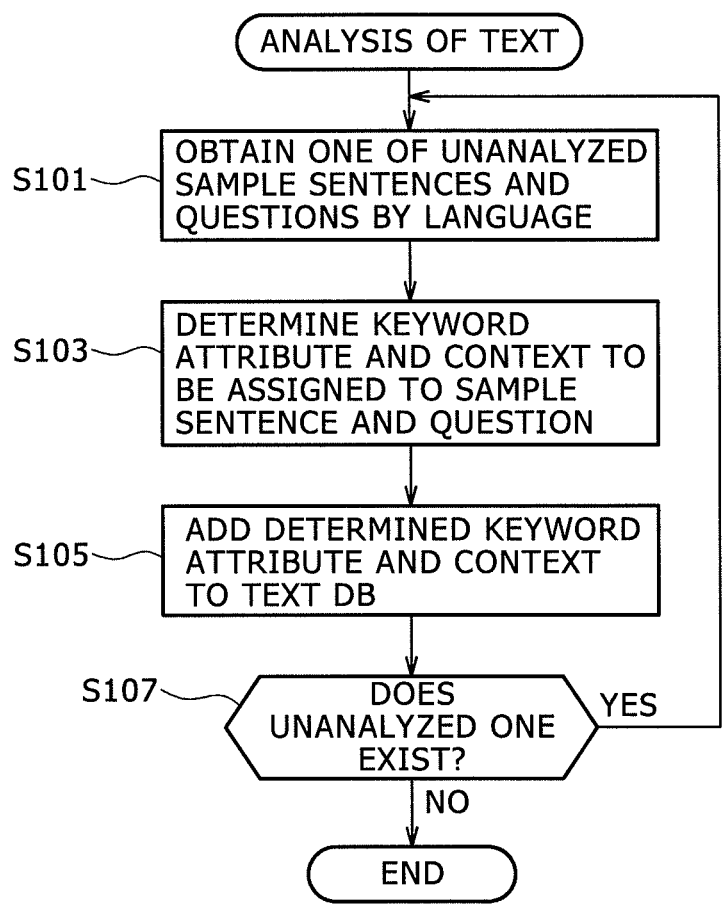
FIG. 18 is a flowchart indicative of one example of a text analysis method.
Figure 19:
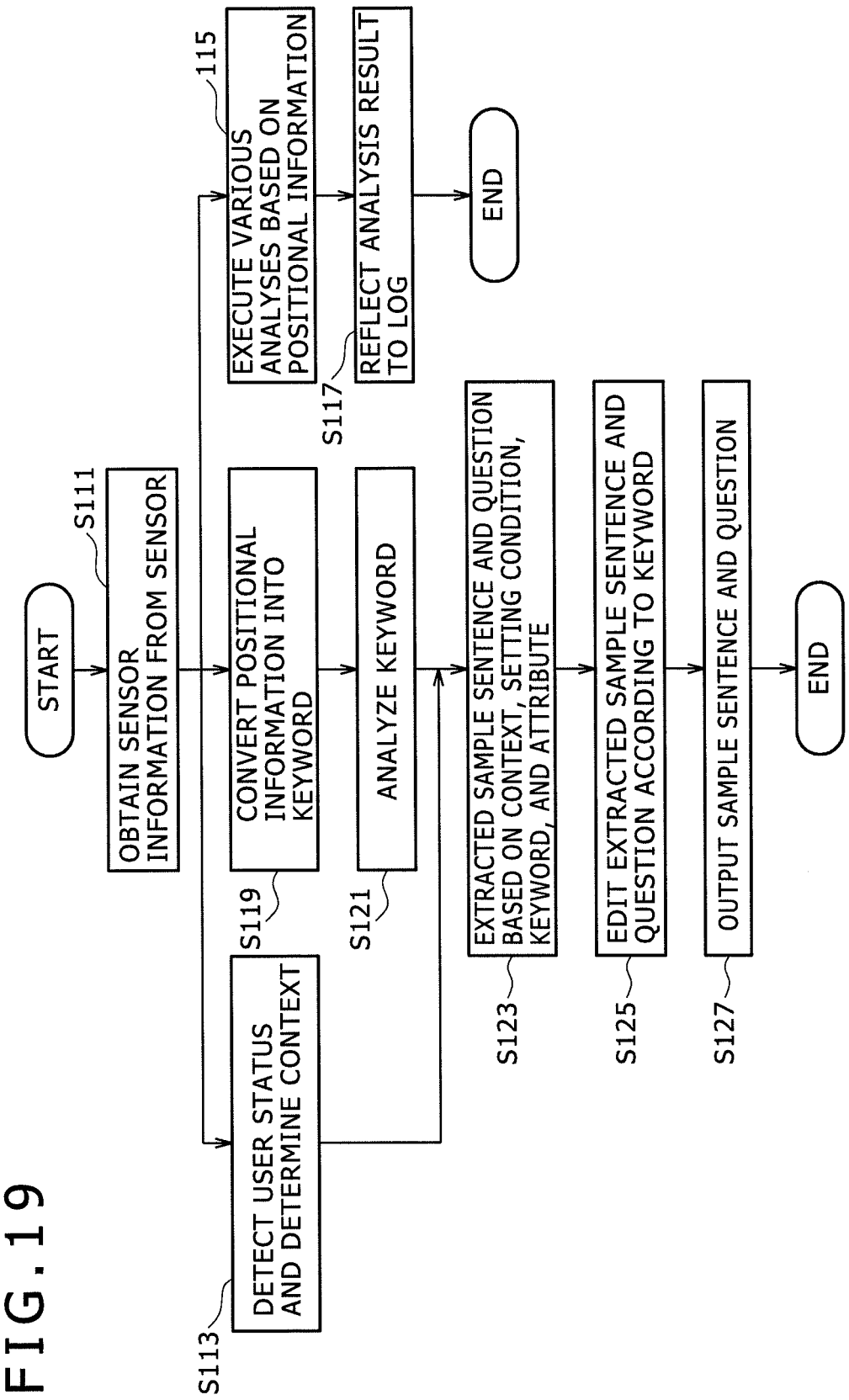
FIG. 19 is a flowchart indicative of one example of a processing flow of a text selection method associated with the first embodiment.
Figure 20:
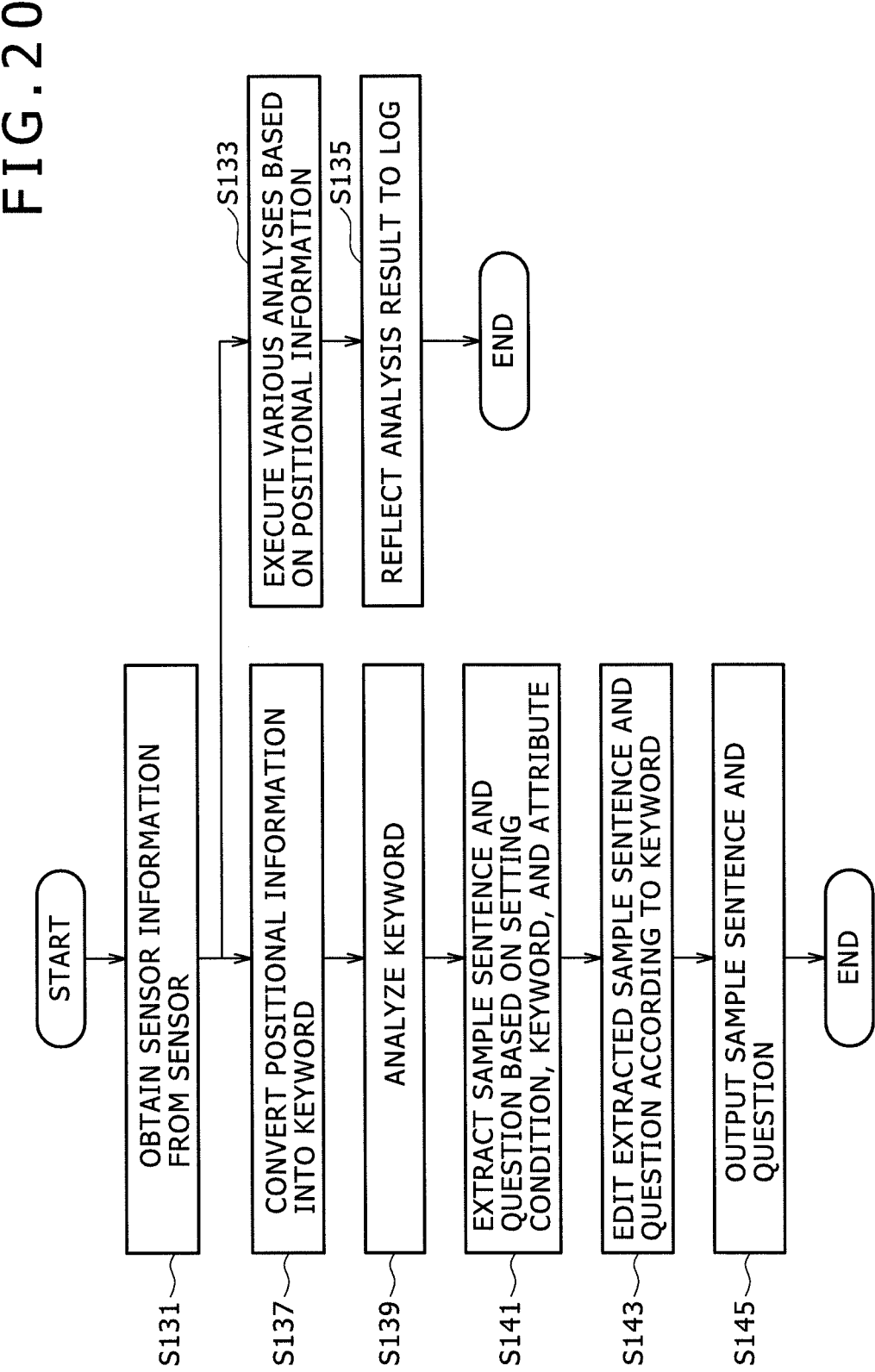
FIG. 20 is a flowchart indicative of one example of a processing flow of another text selection method associated with the first embodiment.

The following briefly describes an exemplary processing flow of an information processing method associated with the present embodiment with reference to FIG. 18 through FIG. 20.

Processing Flow of a Text Analysis Method

First, the processing flow of a text analysis method to be executed by the text analysis block 127 will be briefly described with reference to FIG. 18. FIG. 18 shows a flowchart indicative of the processing flow of the text analysis method associated with the first embodiment of the invention.

First, the text analysis block 127 obtains one unanalyzed sentence from the sample sentence and questions by language stored in the text DB 135 (S101). Next, the text analysis block 127 executes morphological analysis on the obtained unanalyzed sentence to determine a keyword attribute to be assigned to the sample sentence and question and a context in the manner described before (S103). Then, the text analysis block 127 writes the obtained keyword attribute and context to a corresponding location of the text DB 135 (S105).

Subsequently, the text analysis block 127 determines whether there is any other unanalyzed sentence or not (S107). If an unanalyzed sentence is found, the text analysis block 127 returns to step S101 to repeat the above-mentioned processing. If no unanalyzed sentence is found, the text analysis block 127 ends the text analysis processing.

Processing Flow of a Text Selection Method

The following briefly describes a text selection method to be executed by the information processing apparatus 10 associated with the first embodiment of the invention with reference to FIG. 19 and FIG. 20. FIG. 19 and FIG. 20 show flowcharts indicative of the processing flows of the text selection method associated with the first embodiment.

First, with reference to FIG. 19, the sensor information acquisition section 101 obtains sensor information output from various sensors (S111). The sensor information acquisition section 101 outputs the obtained sensor information to the action pattern detection block 123, the positional information analysis block 125, and the keyword conversion block 129 of the text selection section 103.

On the basis of the sensor information (the sensor information output from the motion sensor) supplied from the sensor information acquisition section 101, the action pattern detection block 123 detects a user state to determine a user context (S113). When the context is determined, the action pattern detection block 123 outputs the information about the determined context to the text extraction block 131.

Also, in the basis of the sensor information (positional information) output from the sensor information acquisition section 101, the positional information analysis block 125 executes various analyses associated with frequently visited places or places to be visited next (S115). Then, the positional information analysis block 125 reflects the obtained analysis result and positional information onto the user action log information 133.

By use of various databases and network search engines, the keyword conversion block 129 converts the positional information output from the sensor information acquisition section 101 into keywords, such as address and place name and the names of nearby buildings, roads, shops, and so on (S119). Then, the keyword conversion block 129 outputs the keywords obtained as a result of the conversion to the text analysis block 127. The text analysis block 127 analyzes the keywords supplied from the keyword conversion block 129 (S121) to assign attributes to the analyzed keywords. When the assignment of attributes is completed, the text analysis block 127 outputs the information indicative of the attribute assigned to each keyword to the keyword conversion block 129. Receiving the information indicative of the attribute assigned to each keyword, the keyword conversion block 129 outputs the obtained keywords and the attributes assigned thereto to the text extraction block 131.

On the basis of the context, setting conditions, keywords, attributes, positional information, and so on output from various processing blocks, the text extraction block 131 extracts a proper sample sentence or question from two or more samples sentences and questions stored in the text DB 135 (S123). If the extracted sample sentence or question is matching in attribute and context but mismatching in keyword, the extracted sample sentence or question may be edited in accordance with the keywords (S125). Then, the text extraction block 131 outputs the extracted sample sentence or question to the display control section 105 (S127). The display control section 105 displays the sample sentence or question received from the text extraction block 131 onto a display block, such as a display monitor, of the information processing apparatus 10. Consequently, the user of the information processing apparatus 10 is able to browse sample sentences or questions suited to the user's current location and context selected by the text selection section 103.

With reference to FIG. 19, an example was described in which sample sentences and questions are extracted in accordance with the user's current location, attribute, keyword, context, and so on. The following describes an example of extracting sample sentences and questions without using user's context with reference to FIG. 20.

First, the sensor information acquisition section 101 of the information processing apparatus 10 obtains the sensor information output from various sensors (S131). The sensor information acquisition section 101 outputs the obtained sensor information to the positional information analysis block 125 and the keyword conversion block 129 of the text selection section 103.

On the basis of the sensor information (the positional information) received from the sensor information acquisition section 101, the positional information analysis block 125 executes various analyses associated with frequently visited places or places to be visited next (S133). Then, the positional information analysis block 125 reflects the obtained analysis result and positional information onto the user action log information 133 (S135).

In addition, by use of various databases and network search engines, the keyword conversion block 129 converts the positional information received from the sensor information acquisition section 101 into keywords of address and place name and nearby buildings, roads, shops, and so on (S137). Next, the keyword conversion block 129 outputs the keywords obtained as a result of the conversion to the text analysis block 127. The text analysis block 127 analyzes the keywords received from the keyword conversion block 129 (S139) and assigns attributes to the keywords. When the attribute assignment has been completed, the text analysis block 127 outputs the information indicative of the attribute assigned to each keyword to the keyword conversion block 129. Receiving the information indicative of the attribute assigned to each keyword, the keyword conversion block 129 outputs the information indicative of the obtained keywords and the attributes assigned thereto to the text extraction block 131.

On the basis of the setting conditions, keywords, attributes, positional information, and so on output from various processing blocks, the text extraction block 131 extracts a proper sample sentence or question from two or more samples sentences and questions stored in the text DB 135 (S141). If the extracted sample sentence or question is matching in attribute or the like but mismatching in keyword, the extracted sample sentence or question may be edited in accordance with the keywords (S143). Then, the text extraction block 131 outputs the extracted sample sentence or question to the display control section 105 (S145). The display control section 105 displays the sample sentence or question received from the text extraction block 131 onto a display block, such as a display monitor, of the information processing apparatus 10. Consequently, the user of the information processing apparatus 10 is able to browse sample sentences or questions suited to the user's current location and context selected by the text selection section 103.

As described above, the information processing apparatus 10 associated with the first embodiment of the invention is able to present to the user the sample sentences, questions, and problems that are high in the possibility of being used more practically, being suited to the situations associated with user's current location, frequently visited places, places to be visited next, and user's contexts, for example. Consequently, the information processing apparatus 10 associated with the first embodiment of the invention allows the user to be interested in learning, thereby maintaining the user's learning motivation at high levels. As a result, the user can have efficient learning.

In addition, the information processing apparatus 10 associated with the first embodiment of the invention allows the automatic selection of sentences in accordance with the user's positional information. Therefore, applying the information processing apparatus 10 associated with the first embodiment of the invention to language learning or the like for example allows the automatic presentation of necessary sentences to the user while traveling for example. This allows the user to obtain foreign language conversation sentences suited to specific situations without searching two or more sentences.

It should be noted that the above description has been made with attention paid especially to positional information. However, it is also practicable to do sentence selection by paying attention to the information associated with time, in place of positional information or in addition to positional information. This configuration allows the user to select sentences in accordance with the time at which the user operates the information processing apparatus 10, thereby providing the automatic selection of timely sentences. In addition, obtaining not only time information but also the information associated with the current weather for example obtained from a network search engine for example allows the automatic selection of sentences that reflect the current weather.

(2) Second Embodiment

The following describes an information processing apparatus and a questioning tendency setting method practiced as the second embodiment of the invention with reference to FIG. 21 through FIG. 30.

The information processing apparatus associated with the first embodiment of the invention has a function of automatically selecting texts suited to user's positional information and contexts. An information processing apparatus 10 associated with the second embodiment of the invention to be described below has a function of automatically setting questioning tendencies of questioning in match with user's learning levels. Use of the information processing apparatus 10 associated with the second embodiment allows the user to efficiently carry out his learning.

(2-1) Exemplary Configuration of Information Processing Apparatus

Figure 21:
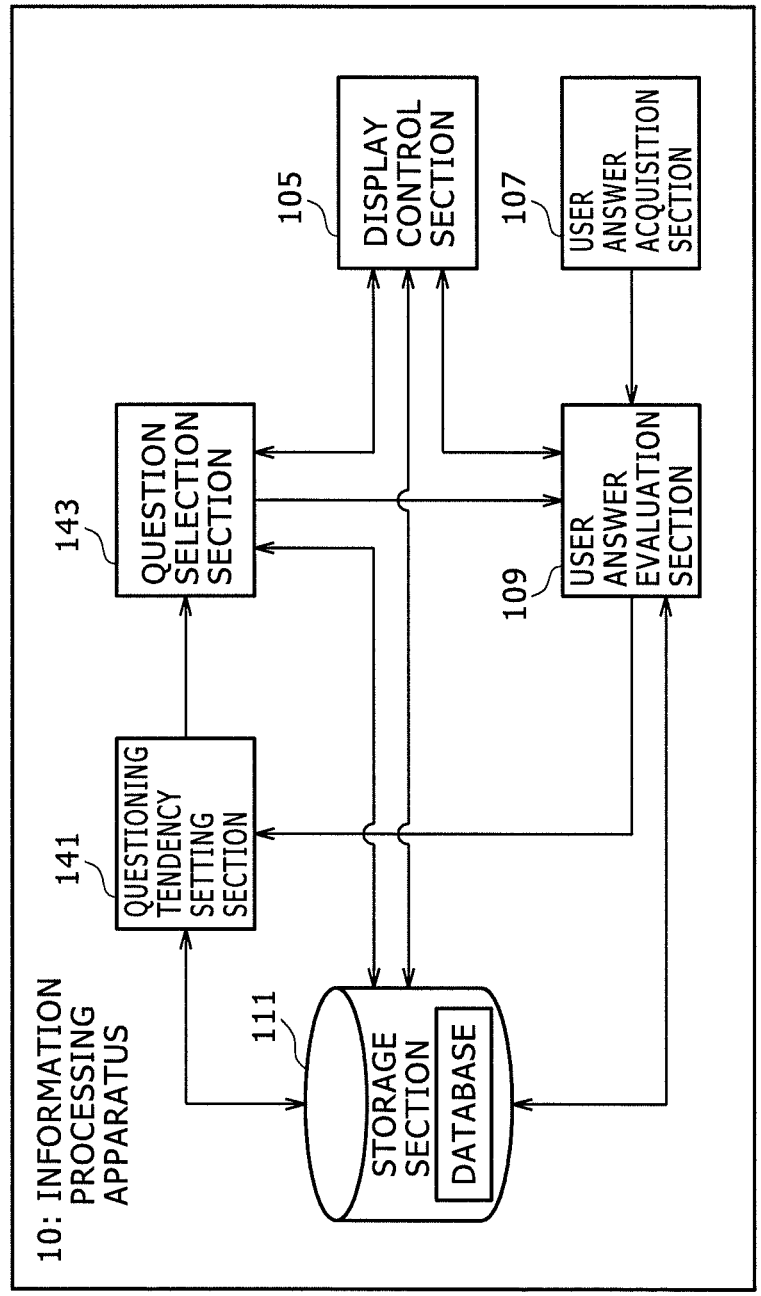
FIG. 21 is a block diagram illustrating an exemplary configuration of an information processing apparatus practiced as a second embodiment of the invention.

First, an exemplary configuration of the information processing apparatus 10 associated with the second embodiment will be described in detail with reference to FIG. 21. FIG. 21 shows a block diagram illustrating an exemplary configuration of the information processing apparatus 10 associated with the second embodiment.

As shown in FIG. 21, the information processing apparatus 10 associated with the second embodiment has a display control section 105, a user answer acquisition section 107, a user answer evaluation section 109, a storage section 111, a questioning tendency setting section 141, and a question selection section 143.

It should be noted that the display control section 105, the user answer acquisition section 107, and the storage section 111 are substantially the same in configuration of effect as the display control section 105, the user answer acquisition section 107, and the storage section 111 of the first embodiment, so that detail description of these functional blocks of the second embodiment will be skipped.

The user answer evaluation section 109 associated with the second embodiment is substantially the same in configuration and effect as the user answer evaluation section 109 associated with the first embodiment except that the user answer evaluation section 109 associated with the second embodiment determines a user answer to a question set by the question selection section 143 and outputs correct/wrong information to the questioning tendency setting section 141. Therefore, details description of the user answer evaluation section 109 associated with the second embodiment will be skipped.

The questioning tendency setting section 141 is realized by a CPU, a ROM, a RAM, and so on for example. In accordance with user's learning levels (or user's degree of proficiency in learning), the questioning tendency setting section 141 automatically sets a tendency in questioning. The questioning tendency set by the questioning tendency setting section 141 includes the preferential questioning of questions similar to a given question or the repetitive questioning of questions not answered proficiently, in addition to the difficulty level of questions, for example.

Detail Configuration Of Questioning Tendency Setting Section

Figure 22:
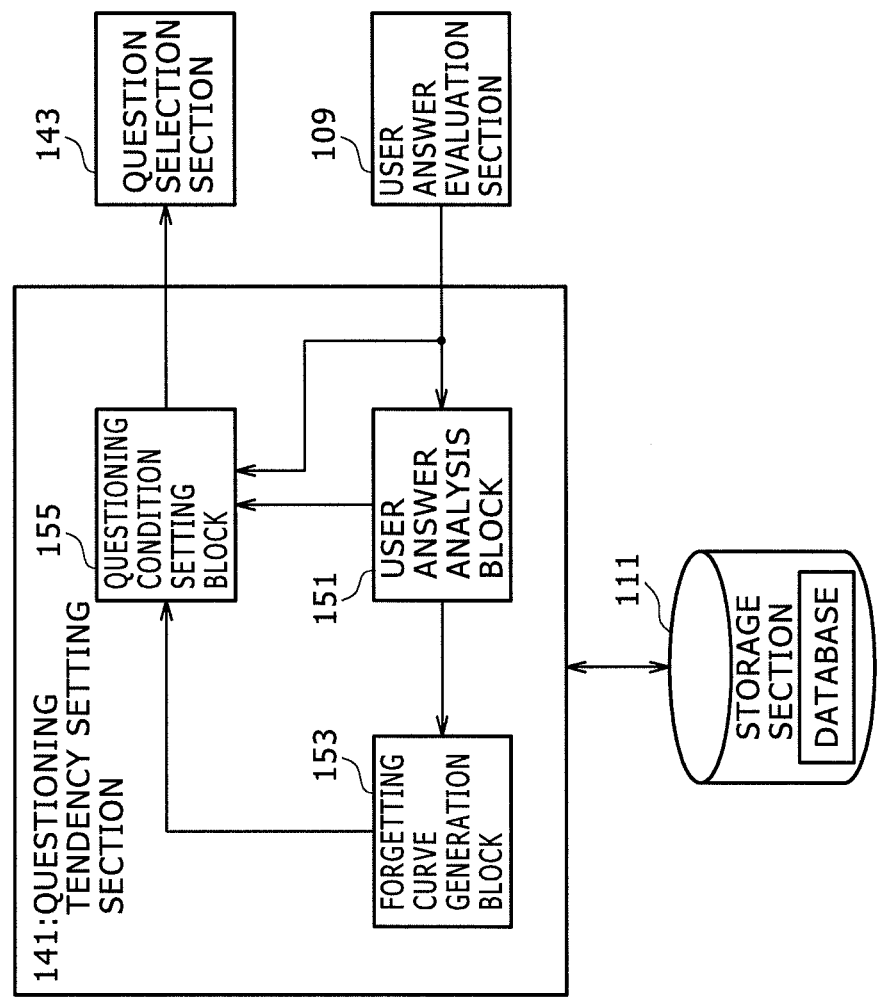
FIG. 22 is a block diagram illustrating an exemplary configuration of a questioning tendency setting section associated with the second embodiment.

The following describes the configuration of the questioning tendency setting section 141 in further detail with reference to FIG. 22. FIG. 22 is a block diagram illustrating an exemplary configuration of the questioning tendency setting section 141 associated with the second embodiment of the invention.

As shown in FIG. 22, the questioning tendency setting section 141 associated with the second embodiment further has a user answer analysis block 151, a forgetting curve generation block 153, and a questioning condition setting block 155.

The user answer analysis block 151 is realized by a CPU, a ROM, a RAM, and so on for example. By use of a user answer correct/wrong evaluation result obtained in the user answer evaluation section 109, the user answer analysis block 151 computes a correct-answer percentage and a wrong-answer percentage of answers made by the user. In addition, by use of the computed user answer correct percentage, the user answer analysis block 151 computes the difficulty level of the question.

The following specifically describes the functions of the user answer analysis block 151.

Upon receiving a user answer correct/wrong evaluation result from the user answer evaluation section 109, the user answer analysis block 151 update a correct-answer percentage table as shown in FIG. 23 and computes a correct-answer percentage of questions corresponding to the correct/wrong evaluation result.

The correct-answer table lists the number of correct answers and the number of questions for each identification information (questioning ID) unique to questioning for each user as shown in FIG. 23. This correct-answer percentage table is stored in a predetermined area of the storage section 111, for example. For example, the number of correct answers for question ID1 for user A is 5 and the number of questions is 20. In this case, suppose that user A have again solved a question corresponding to questioning ID1. Then, if the user answer is correct, one is added to the number of correct answers and the number of questions, which become 6 and 21, respectively. The correct-answer percentage becomes 0.29.

It should be noted that, as the correct-answer percentage goes down, the user feels that the answer to a question in attention more difficult. Therefore, the user answer analysis block 151 can use the reciprocal number of the computed correct-answer percentage as a numeral form of the difficulty of the question. For example, with a question having the number of correct answers and the number of questions being 5 and 20, respectively, the correct-answer percentage is 0.25 and the difficulty is 4.00.

Further, the user answer analysis block 151 updates an wrong-answer matrix as shown in FIG. 24 by use of a correct/wrong evaluation result. As shown in FIG. 24, the wrong-answer matrix has the number of wrong answers and the number of questions for each questioning ID for each user. This wrong-answer matrix is stored in a predetermined area of the storage section 111, for example. From a relation of the number of correct answers+ the number of wrong answers=the number of questions, the user answer analysis block 151 can easily generate a wrong-answer matrix. In addition, by use of a wrong-answer matrix, the user answer analysis block 151 computes a wrong-answer percentage.

Further, by use of a correct/wrong evaluation result, the user answer analysis block 151 updates a table associated with a final answer date and the number of answers as shown in FIG. 25. As shown in FIG. 25, this table lists the final answer date and the number of answers for each questioning ID for each user. This table associated with a final answer date and the number of answers is stored in a predetermined area of the storage section 111, for example. This table associated with a final answer date and the number of answers is used by the forgetting curve generation block 153 to be described later for generating forgetting curves.

Upon updating of these tables, the user answer analysis block 151 updates two or more forgetting percentage tables (hereafter referred to as a forgetting percentage table group) as shown in FIG. 26. Each of the forgetting percentage tables is provided for each number of times answers are made and lists the number of correct answers and the number of questions for each elapsed time (for every day for example). The tables shown in FIG. 23 through FIG. 25 are managed for each user. The forgetting percentage table shown in FIG. 26 is generated with reference to the number of times answers are made (without user distinction). The forgetting percentage table shown in FIG. 26 is indicative of changes in the number of correct answers for each elapsed time (every day) with the number of times answers are made being q.

It should be noted that the forgetting percentage table group generated by the user answer analysis block 151 are not limited to those generated for each questioning in each number of times answers are made as shown in FIG. 26; those tables which are generated for each block of questions (the English vocabulary of the level of seventh grade for example) are also practicable. Generating these forgetting percentage tables of each question block allows the judgment of user answer tendencies in a wider perspective.

When the user answer analysis processing including the updating of various tables comes to an end, the user answer analysis block 151 notifies the forgetting curve generation block 153 and the questioning condition setting block 155 of the information about this end. Upon receiving the information about this end, the forgetting curve generation block 153 and the questioning condition setting block 155 start the processing thereof.

Figure 27:
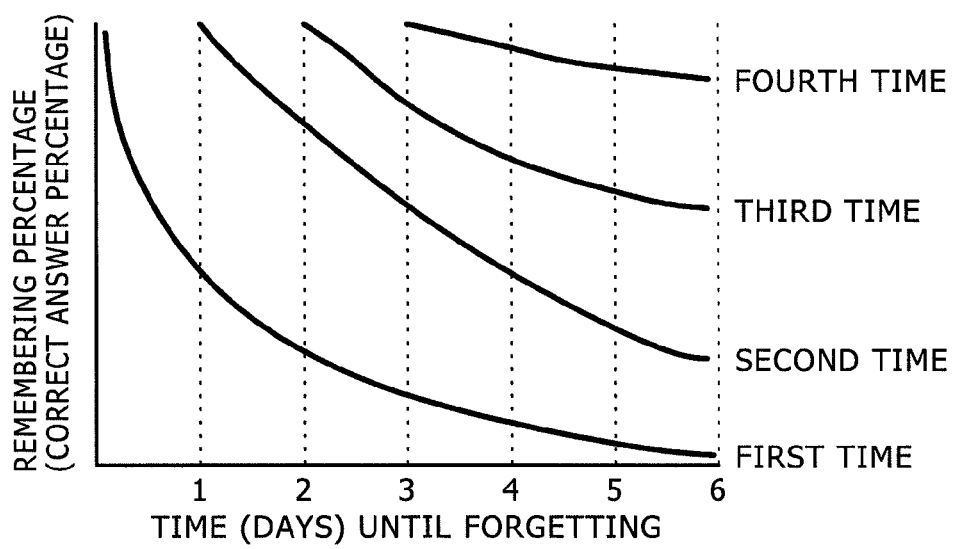
FIG. 27 is a diagram illustrating one example of a forgetting curve.

The forgetting curve generation block 153 is realized by a CPU, a ROM, a RAM, and so on for example. By use of a forgetting percentage table group updated by the user answer analysis block 151, the forgetting curve generation block 153 generates forgetting curves indicative of time-dependent changes in correct-answer percentage. One example of forgetting curves is shown in FIG. 27. As shown in FIG. 27, the forgetting curves are graphed with the horizontal axis being the time up to which the user forgets (namely, the elapsed time) and the vertical axis being the percentage in which the user remembers a matter in attention (namely, the correct-answer percentage). Here, the correct-answer percentage used for the vertical axis is an average of correct-answer percentages for each question (or a block of questions), for example. Because the forgetting curves are generated by use of the forgetting percentage table group shown in FIG. 26, a curve is generated for each number of times answers are made as shown in FIG. 27.

The forgetting curve generation block 153 stores the generated forgetting curves into a predetermined area of the storage section 111, for example. Consequently, the questioning tendency setting section 141 and the question selection section 143 associated with the second embodiment are able to use the generated forgetting curves in executing the processing of these blocks.

Upon ending of the generation of forgetting curves, the forgetting curve generation block 153 notifies the questioning condition setting block 155 of the information indicative of the end of generating the forgetting curves.

It should be noted that, if data is running short or there are many noises, the forgetting curve generation block 153 may make the generated forgetting curves regress to parametric functions.

The questioning condition setting block 155 is realized by a CPU, a ROM, a RAM, and so on, for example. On the basis of a wrong-answer percentage computed by the user answer analysis block 151, the questioning condition setting block 155 computes the similarity between two or more questions and, at the same time, the evaluation values of two or more questions by use of the computed similarity. In addition, the questioning condition setting block 155 updates the user correct-answer percentage computed by the user answer analysis block 151 by use of a correct-answer threshold computed by use of the above-mentioned forgetting percentage table group.

The following specifically describes the updating of correct-answer percentage.

By use of the user correct-answer percentage and the forgetting percentage table group stored in the storage section 111, the questioning condition setting block 155 updates user correct-answer percentage p from equation 101 below if any of the following conditions applies. In equation 101 below, p denotes a user correct-answer percentage and r denotes a correct-answer threshold computed from the forgetting percentage table group. Further, η denotes a coefficient (a learning percentage) indicative of user's degree of learning, which is a parameter that is appropriately determined in advance. It should be noted that, in equation 101 below, the correct-answer percentage after updating is written as p' for convenience.

Condition 1: user answer is wrong and p<r
Condition 2: user answer is correct and p>r $$p' = p + \eta(r-p) \quad (101)$$

It should be noted that, if the information processing apparatus 10 associated with the second embodiment of the invention is used for the first time, the questioning condition setting block 155 assumes that user correct-answer percentage p be a correct-answer percentage of the entire information processing apparatus (namely, an average of correct-answer percentages of all registered users, for example). Further, if the user made answer to a question m times and the m-th answer was made n days after the date of the last answer, then the questioning condition setting block 155 assumes that correct-answer threshold r be a correct-answer percentage computed from the number of correct answers and the number of questions written to the column after n days in the m-th forgetting percentage table.

Figure 28:
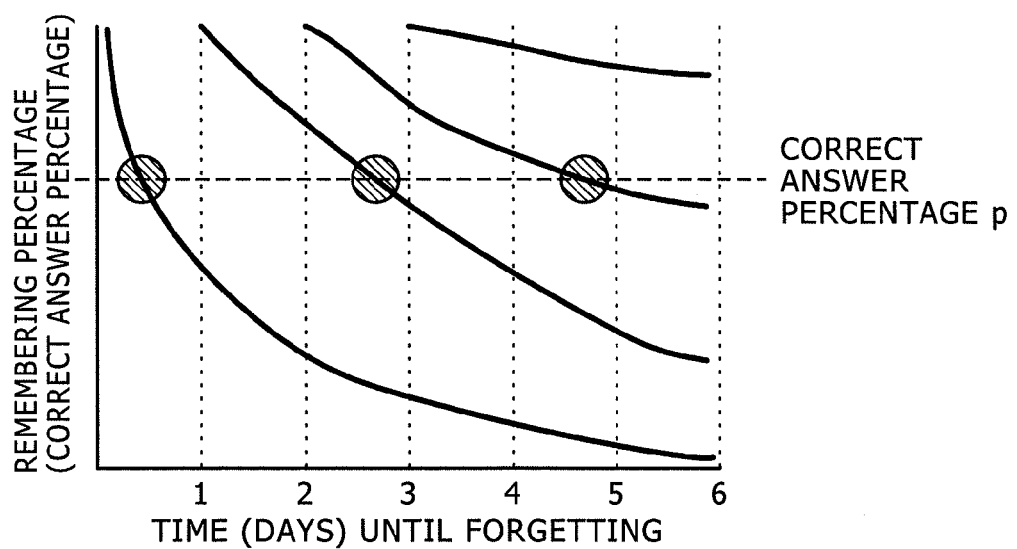
FIG. 28 is a diagram illustrating one example of a questioning tendency setting method associated with the second embodiment.
Figure 29:
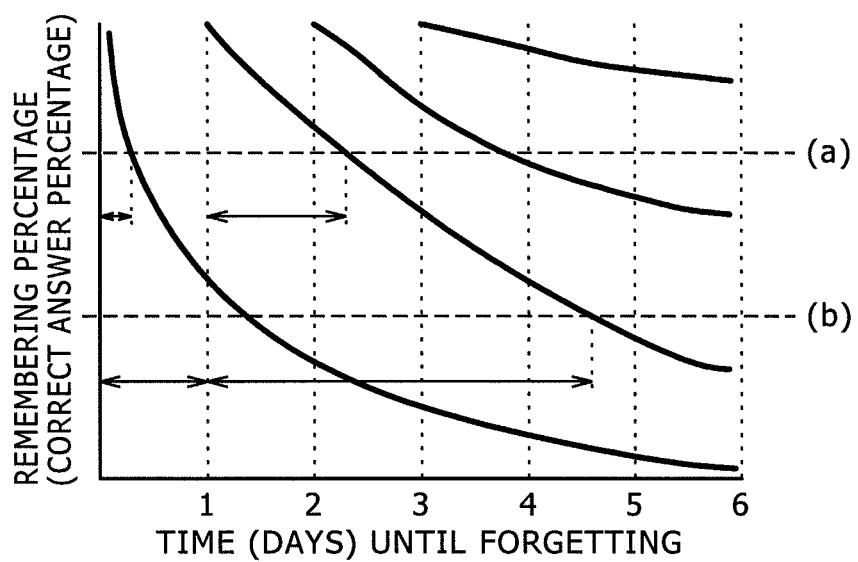
FIG. 29 is a diagram illustrating one example of another questioning tendency setting method associated with the second embodiment.

The user correct-answer percentage thus updated is usable in setting a period up to setting a question again as shown in FIG. 28, for example. To be more specific, in the information processing apparatus 10 associated with the second embodiment of the invention, questions (namely, the questions with the period shown in FIG. 28 passed or passing from the time when the last answer was made) indicated by hatching shown in FIG. 28 are automatically selected. Also, as described above, correct-answer percentage p is updated on the basis of equation 101 above if a predetermined condition is satisfied (to be more specific, in the case of a wrong answer, correct-answer percentage p is updated to increase and, in the case of a correct answer, correct-answer percentage p is updated to decrease). Hence, in the information processing apparatus 10 associated with the second embodiment, the period up to the re-questioning is also changed dynamically. To be more specific, as shown in FIG. 29, as correct-answer percentage p obtains higher ((a) in the figure), the questioning is executed again without interval; as correct-answer percentage p obtains lower ((b) in the figure), questioning is executed again with an interval.

The updating of the correct-answer percentage shown in equation 101 above is desirably executed when a question set by the information processing apparatus 10 associated with the second embodiment is demanded to consider forgetting. However, if a question set by the information processing apparatus 10 associated with the second embodiment is not demanded to consider forgetting, the above-mentioned updating of correct-answer percentages need not be executed.

Also, by use of the wrong-answer matrix updated by the user answer analysis block 151, the questioning condition setting block 155 computes similarity sim(j, k) between question j and question k from equation (102) below. In equation (102) below, M(i, j) is a wrong-answer percentage in question j of user i, which is a value to be computed by use of the wrong-answer matrix (or the correct-answer percentage of question j of user i). In equation (102) below, parameter N denotes the number of registered users.

$$sim(j, k) = \frac{\sum_{i=1}^{N} M(i, j) \cdot M(i, k)}{\sqrt{\sum_{i=1}^{N} M(i, j)^2} \cdot \sqrt{\sum_{i=1}^{N} M(i, k)^2}} \quad (102)$$

Thus, the questioning condition setting block 155 is able to grasp the similar questions in a numeric form by the cognitive filtering (CF) technique for computing the degree of getting wrong answers to both question j and question k (a wrong-answer cooccurrence score).

Next, by use of computed similarity sim(j, k) and the wrong-answer matrix, the questioning condition setting block 155 computes a score for each question by equation (103) below. In equation (103) below, P denotes a parameter indicative of a total number of questions.

$$S_{CF}(k) = \sum_{j=1}^{P} sim(j, k) \cdot M(i, j) \quad (103)$$

If it a question to be set is one that must consider forgetting, the questioning condition setting block 155 may correct an evaluation value as follows when any of the following conditions applies. In the conditions shown below, p denotes a user correct-answer percentage and r denotes a correct-answer percentage threshold that is computed from the forgetting percentage table group. It should be noted that correct-answer percentage threshold r is, if the user made answer to a question k m times and the m-th answer was made n days after the date of the last answer, a correct-answer percentage computed from the number of correct answers and the number of questions written to the column after n days in the m-th forgetting percentage table.

Condition a: if r>p, then evaluation value $S_{CF}(k)=0$
Condition b: if r≤p, then evaluation value $S_{CF}(k)=(p-r)\times S_{CF}(k)$ Correcting the evaluation value as described above prevents a corresponding question from being set because the evaluation value becomes 0 in a situation where the user still remembers the question (or a situation where condition a is satisfied). In a situation where condition b is satisfied, it is possible for the user to have forgotten the contents of learning indicated by a question, so that the evaluation value of a question that the user may have forgotten more likely is corrected more.

When the computation of evaluation value $S_{CF}(k)$ has been completed, the questioning condition setting block 155 outputs the computed evaluation value $S_{CF}(k)$ to the question selection section 143.

The detail configuration of the questioning tendency setting section 141 associated with the second embodiment has been described with reference to FIG. 22 through FIG. 29. The following describes the information processing apparatus 10 associated with the second embodiment with reference to FIG. 21 again.

The question selection section 143 is realized by a CPU, a ROM, a RAM, and so on, for example. The question selection section 143 selects a question to be set from two or more questions on the basis of an evaluation value computed by the questioning condition setting block 155 and a user correct-answer percentage in a predetermined period or the predetermined number of questions.

To be more specific, when evaluation value $S_{CF}(k)$ is notified from the questioning condition setting block 155, the question selection section 143 first computes a correct-answer percentage of a question answered by the corresponding user immediately before. The question answered by the corresponding user immediately before may be a question answered a predetermined period (several days for example) before the current point of time or a question answered the predetermined number of questions from the current point of time, for example. This computation of a correct-answer percentage is executable by referencing the log information of correct/wrong evaluation results for each user and a table associated with the final answer date and the number of answer times stored in the storage section 111.

Next, the question selection section 143 computes an absolute values of a difference between the computed user correct-answer percentage immediately before and a question correct-answer percentage. The question correct-answer percentage is computable by referencing the correct-answer percentage table stored in the storage section 111.

Then, by use of the computed absolute values, the question selection section 143 selects the predetermined number of questions sequentially in the ascending order the absolute values and sorts the selected questions in the order of evaluation value $S_{CF}(k)$ associated with the corresponding questions.

Next, the question selection section 143 selects the predetermined number of questions sequentially from the higher evaluation values $S_{CF}(k)$ that have been sorted above, thereby providing the questions to be answered by the user.

When the questions to be answered by the user have been selected as above, the question selection section 143 outputs the information about the selected questions to the display control section 105 and the user answer evaluation section 109.

It should be noted that, in the description made above, a forgetting curve is generated for each question to set a correct-answer percentage line for each user as a parameter; it is also practicable to use an inverse arrangement. To be more specific, a forgetting curve may be generated for each user to set a correct-answer percentage line as parameter for each question.

Actually, with many exercise books, a learning sequence is predetermined between questions, such as the solution of question B requires the knowledge of question A, for example. Hence, it is practicable to define beforehand a learning sequence, such as described above, between two or more questions registered in the storage section 111, thereby storing the information associated with a question in attention and associated questions (the information associated with a learning sequence) as so-called meta data. If the information associated with a learning sequence is available, a method of setting questioning tendencies described below can be executed, for example.

In other words, assume that the user be proficient with question A and set a question H more difficult than question A as a target. Then, in this case, the questioning tendency setting section 141 sets a route from question A to question H on the basis of the above-mentioned information associated with learning sequence. This route may be a shortest route for solving question H in a shortest manner or another route that is most efficient, not to say the shortest, for the user to learn without much straining himself. Setting such a route allows the questioning tendency setting section 141 to efficiently help the user reach a learning level targeted by him by setting questions along this route.

Thus, one example of the functions of the information processing apparatus 10 associated with the second embodiment has been described. Each of the above-mentioned component elements may be configured by a general-purpose member for a circuit or a hardware device dedicated to the function of each component element. The function of each component element may all be carried out by the CPU and so on, for example. Therefore, the configuration to be used may be appropriately changed in accordance with technological levels valid at the time of practicing the second embodiment.

It is practicable to write a computer program for realizing each of the functions of the information processing apparatus practiced as the second embodiment of the invention and install the written computer program in a personal computer or the like, for example. In addition, a computer-readable recording media storing such computer programs may be provided. This recording media may include a magnetic disk, an optical disk, a magneto-optical disk, and a flush memory, for example. Also, the above-mentioned computer program may be distributed through networks for example, rather than in a recording media.

(2-2) Processing Flow of Questioning Tendency Setting Method

Figure 30:
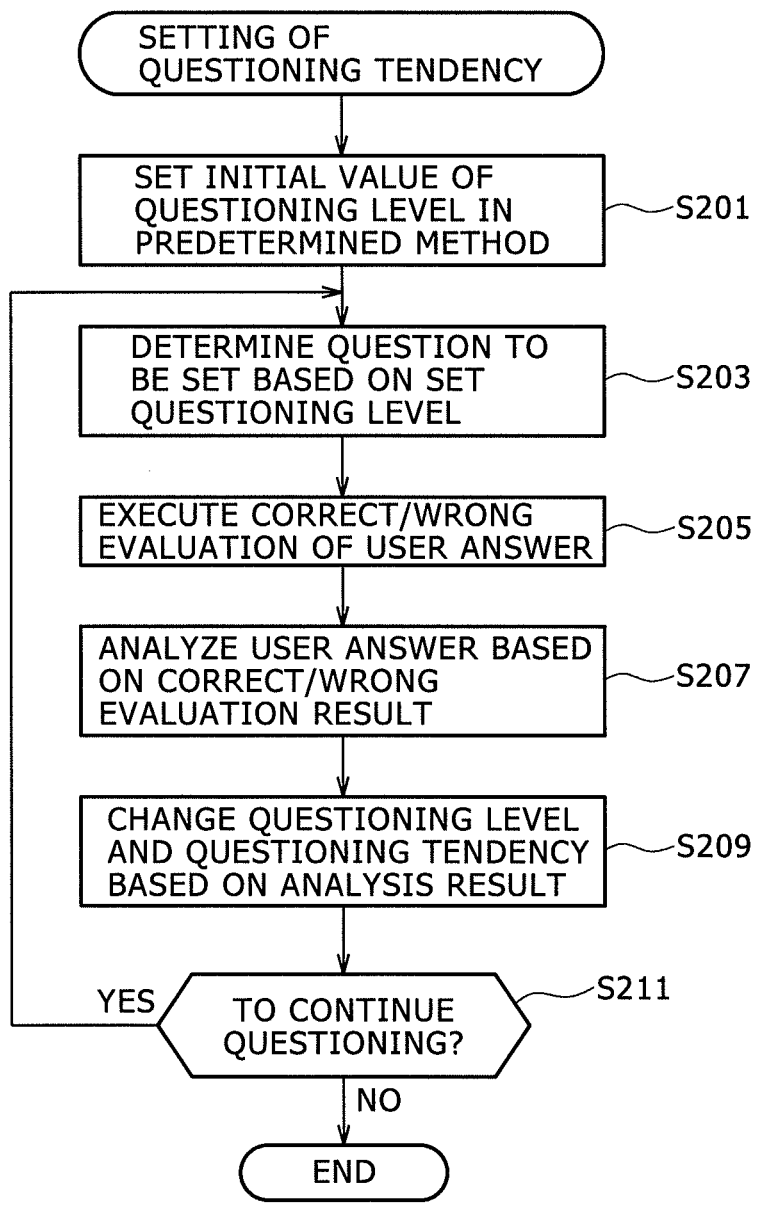
FIG. 30 is a flowchart indicative of a processing flow of a questioning tendency setting method associated with the second embodiment.

The following briefly describes the processing flow of the questioning tendency setting method that is executed in the information processing apparatus 10 associated with the second embodiment with reference to FIG. 30. FIG. 30 shows the processing flow of the questioning tendency setting method associated with the second embodiment.

First, the questioning tendency setting section 141 sets an initial value of a questioning level in a predetermined method (S201). An example of this initial value may be an average value of the correct-answer percentages of all registered users, for example.

Next, on the basis of the questioning level set by the questioning tendency setting section 141, the question selection section 143 determines a question to be set (S203). In this example, because the average value of the correct-answer percentages of all registered users is set as the initial value, for example, the questioning level is set on the basis of this average value of correct-answer percentages, thereby selecting questions.

When a question is selected as described above and displayed on the display block, such as a display monitor, the user enters an answer to that question through a predetermined input apparatus. The user answer acquisition section 107 acquires the entered user answer and outputs the acquired user answer to the user answer evaluation section 109.

The user answer evaluation section 109 executes a correct/wrong evaluation on the user answer output from the user answer acquisition section 107 (S205). Consequently, whether the user answer is correct or wrong is determined. When an evaluation result is established, the user answer evaluation section 109 outputs the obtained evaluation result to the display control section 105 and to the user answer analysis block 151 and the questioning condition setting block 155 of the questioning tendency setting section 141.

On the basis of the notified correct/wrong evaluation result of the user answer, the user answer analysis block 151 executes user answer analysis processing, such as updating of various tables (S207). In addition, when the user answer analysis processing has been completed, the forgetting curves are also updated by the forgetting curve generation block 153.

Then, in accordance with the analysis result obtained by the user answer analysis block 151, the questioning condition setting block 155 computes a correct-answer percentage, a similarity, and an evaluation value to change questioning levels and questing tendencies (S209). When questioning levels and questing tendencies have been changed, the changed questioning levels and questioning tendencies are notified to the question selection section 143.

Here, the question selection section 143 determines whether to continue questioning or not (S211). If a request is made by the user to stop questioning, then the information processing apparatus 10 ends the processing without continuing the questioning. If the questioning is to be continued, the question selection section 143 returns to step S203 to determine a question to be set on the basis of the questioning level and so on set in step S209.

The execution of the processing described above allows the information processing apparatus 10 associated with the second embodiment to automatically set the questioning tendency of questions in accordance with the user's learning level.

It should be noted that, if a questioning level and so on are once set on the basis of a user answer analysis result and the processing shown in FIG. 30 is subsequently executed, then it is desired to start the processing not from step S201 but from step S203. This allows the user to restart the learning with the learning results acquired up to the last question (namely, the questioning level and so on that have been set) reflected even if the learning through the information processing apparatus 10 has been discontinued.

(3) Third Embodiment

(3-1) Configuration of Information Processing Apparatus

Figure 31:
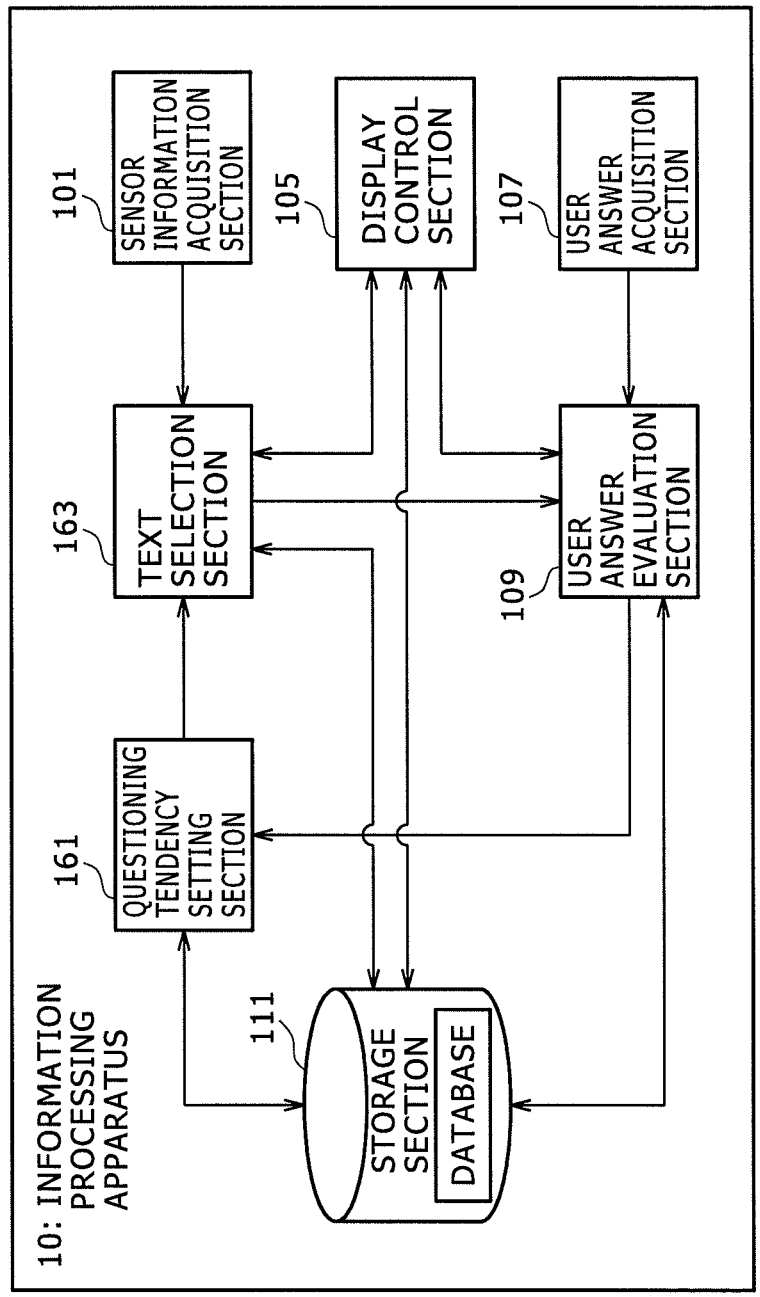
FIG. 31 is a block diagram illustrating an exemplary configuration of an information processing apparatus practiced as a third embodiment of the invention.

The following briefly describes an information processing apparatus 10 practiced as a third embodiment of the invention with reference to FIG. 31. The information processing apparatus 10 associated with the third embodiment has the function of the information processing apparatus 10 associated with the first embodiment that a text suited to user's positional information and context is automatically selected and the function of the information processing apparatus 10 associated with the second embodiment that a questioning tendency of questions is automatically set in accordance with user's learning levels.

As shown in FIG. 31, the information processing apparatus 10 associated with the third embodiment mainly has a sensor information acquisition section 101, a display control section 105, a user answer acquisition section 107, a user answer evaluation section 109, a storage section 111, a questioning tendency setting section 161, and a text selection section 163.

It should be noted that the sensor information acquisition section 101, the display control section 105, the user answer acquisition section 107, and storage section 111 of the third embodiment are substantially the same in function and effect as those of the first embodiment and the second embodiment. Therefore, detail description of these sections will skipped.

The user answer evaluation section 109 is substantially the same in function and effect as those of the first embodiment and the second embodiment except that the user answer evaluation section 109 associated with the third embodiment determines a user answer associated with a problem (or a question) set by the text selection section 163 and outputs the information associated with correct/wrong evaluation to the questioning tendency setting section 161. Therefore, detail description of the user answer evaluation section 109 will be skipped.

The questioning tendency setting section 161 is substantially the same in function and effect as the questioning tendency setting section 141 associated with the second embodiment except that the questioning tendency setting section 161 outputs computed evaluation value $S_{CF}(k)$ to the text selection section 163. Therefore, detail description of the questioning tendency setting section 161 will be skipped.

The text selection section 163 selects texts corresponding to a question on the basis of evaluation value $S_{CF}(k)$ output from the questioning tendency setting section 161. Then, the text selection section 163 selects, from the texts selected on the basis of the evaluation value, a text suited to the information obtained from the sensor information acquisition section 101 in a method described with reference to the first embodiment. Thus, selecting a text to be presented to the user allows the automatic selection of a text suited to user's learning level and user's positional information and context.

Thus, one example of the functions of the information processing apparatus 10 associated with the third embodiment has been described. Each of the above-mentioned component elements may be configured by a general-purpose member for a circuit or a hardware device dedicated to the function of each component element. The function of each component element may all be carried out by the CPU and so on, for example. Therefore, the configuration to be used may be appropriately changed in accordance with technological levels valid at the time of practicing the third embodiment.

It is practicable to write a computer program for realizing each of the functions of the information processing apparatus practiced as the third embodiment of the invention and install the written computer program in a personal computer or the like, for example. In addition, a computer-readable recording media storing such computer programs may be provided. This recording media may include a magnetic disk, an optical disk, a magneto-optical disk, and a flash memory, for example. Also, the above-mentioned computer program may be distributed through networks for example, rather than in a recording media.

Figure 32:
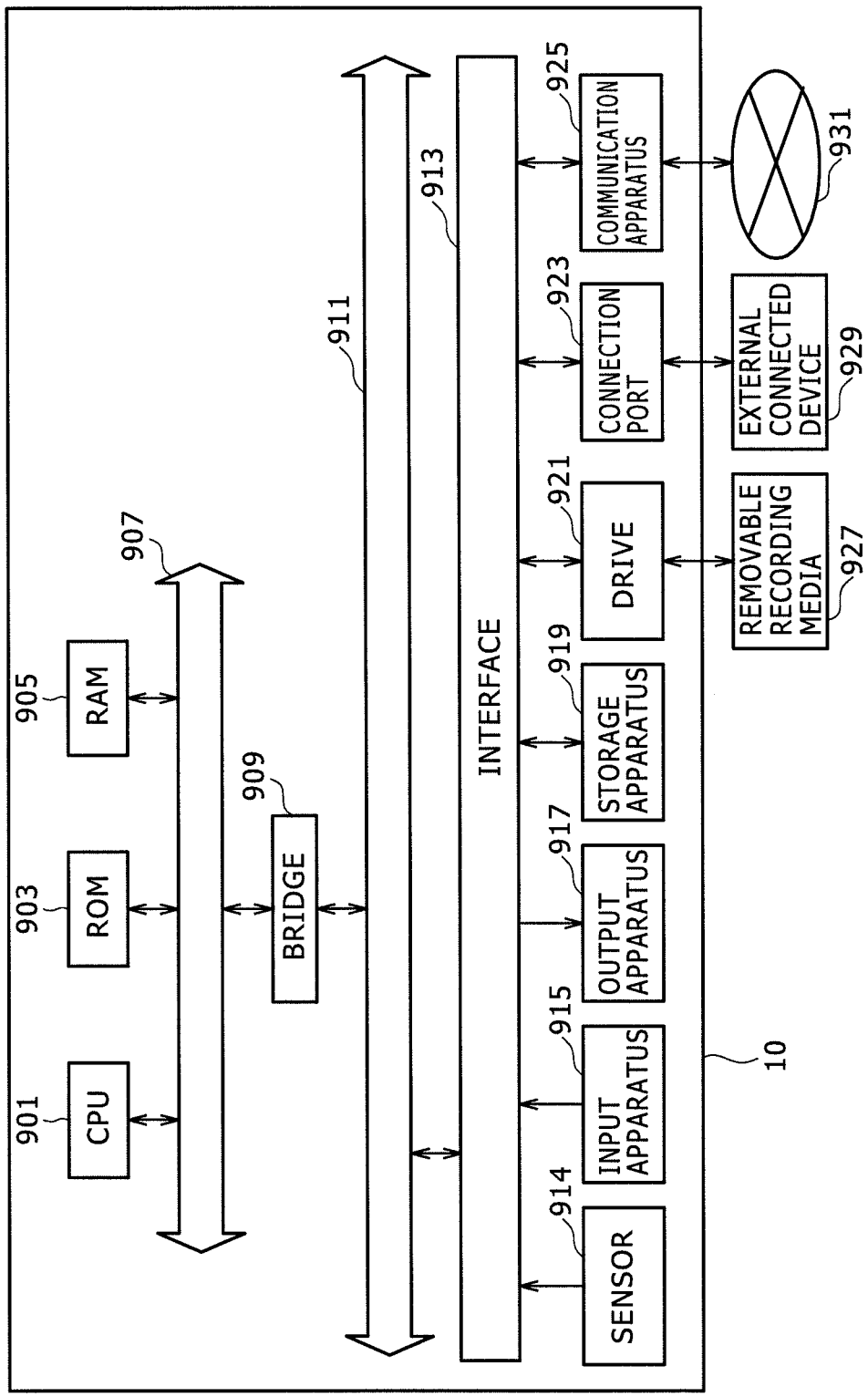
FIG. 32 is a block diagram illustrating an exemplary hardware configuration of a computer associated with the embodiments of the invention.

(4) Exemplary Hardware Configuration of Information Processing Apparatus (Computer) Associated with the Embodiments of the Present Invention The following describes in detail an exemplary hardware configuration of the information processing apparatus 10 associated with the embodiments of the present invention with reference to FIG. 32. FIG. 32 is a block diagram illustrating an exemplary hardware configuration of the information processing apparatus 10 associated with the embodiments of the present invention.

The information processing apparatus 10 has mainly a CPU 901, a ROM 903, and a RAM 905. In addition, the information processing apparatus 10 has a host bus 907, a bridge 909, an external bus 911, an interface 913, a sensor 914, an input apparatus 915, an output apparatus 917, a storage apparatus 919, a drive 921, a connection port 923, and a communication apparatus 925.

The CPU 901 functions as an arithmetic and logical unit or a control apparatus, thereby controlling all or part of the operations of the information processing apparatus 10 as instructed by various programs recorded to the ROM 903, the RAM 905, the storage apparatus 919, and a removable recording media 927. The ROM 903 stores programs and parameters that are for use by the CPU 901. The RAM 905 temporarily stores programs for use by the CPU 901 and parameters and so on that change from time to time in program execution. These functional units are interconnected by the host bus 907 configured by an internal bus, such as a CPU bus.

The host bus 907 is connected to an external bus, such as a PCI (Peripheral Component Interconnect/Interface) bus, via the bridge 909.

The sensor 914 is a detection portion, such as a sensor for detection a user motion and a sensor for obtaining information indicative of a current position, for example. This detection portion includes motion sensors and a GPS sensor, for example. The motion sensors are three-axis acceleration sensors including an acceleration sensor, a gravity detection sensor, and a drop detection sensor or three-axis gyro sensors including an angular velocity sensor, handshake correction sensor, and a geomagnetism sensor. In addition, the sensor 914 may have various measuring devices, such as a thermometer, an illuminometer, and a hygrometer, for example.

The input apparatus 915 is an operator portion that is operated by the user, such as a mouse, a keyboard, a touch panel, buttons, switches, levers, and so on, for example. Also, the input apparatus 915 may be a remote control portion (a so-called remote commander) based on infrared radiation or electromagnetic wave or an externally connected device 929, such as a mobile phone or PDA corresponding to the operation of the information processing apparatus 10, for example. Further, the input apparatus 915 is configured by an input control circuit and so on that generate an input signal on the basis of information entered by the user through the above-mentioned operator portion, for example, and supplies the generated input signal to the CPU 901. Through this input apparatus 915, the user of the information processing apparatus 10 is able to enter various kinds of data into the information processing apparatus 10 and gives instructions to thereto.

The output apparatus 917 is configured by an apparatus that is able to visually or auditorily notify the user of the obtained information. This apparatus includes a display apparatus, such as a CRT display apparatus, a liquid crystal display apparatus, a plasma display apparatus, an EL display apparatus, or lamps, an audio output apparatus, such as a loudspeaker or headphones, a printer apparatus, a mobile phone, or a facsimile apparatus, for example. The output apparatus 917 outputs results obtained from various processing operations executed by the information processing apparatus 10, for example. To be more specific, the display apparatus displays, in text or image, results obtained by various processing operations executed by the information processing apparatus 10. On the other hand, the audio output apparatus converts audio signals composed of reproduced voice data or acoustic data into analog signals and outputs these converted analog signals from the loudspeaker, for example.

The storage apparatus 919 is a data storage apparatus configured as one example of the storage section of the information processing apparatus 10. The storage apparatus 919 is configured by a magnetic storage device like an HDD (Hard Disk Drive), a semiconductor storage device, an optical storage device, or a magneto-optical storage device, for example. This storage apparatus 919 stores programs and various kinds of data to be executed by the CPU 901 and various kinds of data externally obtained.

The drive 921 is a reader/writer for recording media, which is incorporated in the information processing apparatus 10 or connected externally to thereto. The drive 921 reads information from the removable recording media 927, such as a magnetic disk, an optical disk, a magneto-optical disk, or a semiconductor memory that is loaded on the drive 921 and outputs the read information to the RAM 905. In addition, the drive 921 is able to write information to the removable recording media 927, such as a magnetic disk, an optical disk, a magneto-optical disk, or a semiconductor memory that is loaded on the drive 921. The removable recording media 927 is a DVD media, an HD-DVD media, or a Blu-ray media, for example. Also, the removable recording media 927 may be a compact flash (CF) (registered trade mark), or an SD (Secure Digital) memory card, for example. Further, the removable recording media 927 may be an IC (Integrated Circuit) card mounted on a non-contact IC chip or an electronic device, for example.

The connection port 923 is a port for connecting a device directly to the information processing apparatus 10. One example of the connection port 923 is a USB (Universal Serial Bus) port, an IEEE1394 port, or a SCSI (Small Computer System Interface) port, for example. Another example of the connection port 923 is an RS-232C port, an optical audio terminal, or an HDMI (High Definition Multimedia Interface) port, for example. Connecting the externally connected device 929 to this connection port 923 allows the information processing apparatus 10 to acquire various kinds of data from the externally connected device 929 and provide various kinds of data thereto.

The communication apparatus 925 is a communication interface configured by a communication device or the like for connection to a communication network 931. The communication apparatus 925 is a communication card or the like for wired or wireless LAN (Local Area Network), Bluetooth (registered trademark), or WUSB (Wireless USB), for example. Also, the communication apparatus 925 may be an optical communication router, an ADSL (Asymmetric Digital Subscriber Line) router, or a communication modem, for example. This communication apparatus 925 is able to transmit and receive signals and so on with the Internet or other communication apparatuses, for example, in accordance with a predetermined communication protocol, such as TCP/IP, for example. Further the communication network 931 connected to the communication apparatus 925 is configured by a network connected wiredly or wirelessly and may be the Internet, a household LAN, infrared ray communication, radio wave communication, or satellite communication, for example.

Described above is one example of the hardware configuration that can realize the functions of the information processing apparatus 10 associated with the embodiments of the present invention. Each of the above-mentioned component elements may be configured by a general-purpose member for a circuit or a hardware device dedicated to the function of each component element. Therefore, the configuration to be used may be appropriately changed in accordance with technological levels valid at the time of practicing these embodiments.

While preferred embodiments of the present invention have been described using specific terms, such description is for illustrative purpose only, and it is to be understood that changes and variations may be made without departing from the spirit or scope of the following claims.

The present application contains subject matter related to that disclosed in Japanese Priority Patent Application JP 2010-101042 filed in the Japan Patent Office on Apr. 26, 2010, the entire content of which is hereby incorporated by reference.

What is claimed is:

1. An information processing apparatus comprising:
a memory storing instructions; and
one or more processors configured to execute the instructions to:
configure a sensor information acquisition section to acquire sensor information outputted from a sensor for detecting a user motion and sensor information outputted from a sensor for obtaining a user current location;
configure an action pattern detection block to analyze sensor information from said sensor for detecting a user motion acquired by said sensor information acquisition section to detect an action pattern corresponding to the acquired sensor information from a plurality of action patterns obtained by classifying user's actions that are executed in a comparatively short time of several seconds to several minutes;
configure a keyword conversion block to convert, on the basis of said sensor information indicative of a current location acquired by said sensor information acquisition section, said information indicative of a current location into at least one keyword associated with current information associated with said current location by use of databases and network search engines;
configure a positional information analysis block to generate information associated with a place of user's frequent visit and a place of user's probable visit next to the current location by use of information indicative of the current location acquired by said sensor information acquisition section and a log of said information indicative of a current location,
wherein said place of user's frequent visit is determined by computing the frequency of the user's visits from the log of said information and calculating a score on the basis of the computed frequency,
wherein said place of user's probable visit next to the current location is determined by computing a conditional probability of the user's moving from the current position to each of the places written to the log of said information and calculating a score on the basis of the obtained conditional probability, and
wherein the one or more processors further configure said keyword conversion block to convert said information associated with a place of user's frequent visit and a place of user's probable visit next to the current location into a keyword; and
configure a text extraction block to extract a text for user presentation from a plurality of texts on the basis of said action pattern detected by said action pattern detection block and said at least one keyword generated by said keyword conversion block.

2. The information processing apparatus according to claim 1, wherein the one or more processors are further configured to execute the instructions to:
configure a text analysis block to analyze each of said plurality of texts to assign an attribute to each word making up each analyzed text and assign a context indicative of at least one of motion and state indicated by each of said plurality of texts thereto,
wherein the one or more processors further configure said keyword conversion block to output at least one keyword associated with said current location to said text analysis block, and
wherein the one or more processors further configure said text analysis block to assign an attribute to said at least one keyword associated with said current location outputted from said keyword conversion block.

3. The information processing apparatus according to claim 2,
wherein the one or more processors further configure said text extraction block to refer to said context assigned to each of said plurality of texts, said each word included in each of said plurality of texts, and said attribute assigned to said each word to extract a text that matches at least any one of said action pattern detected by said action pattern detection block, at least one keyword generated by said keyword conversion block, and said attribute assigned to said keyword.

4. The information processing apparatus according to claim 3,
wherein, if a text with which said attribute matches but said keyword does not match has been extracted, the one or more processors further configure said text extraction block to replace the word included in the extracted text by the keyword generated by said keyword conversion block.

5. The information processing apparatus according to claim 1,
wherein the one or more processors further configure said keyword conversion block to convert said information indicative of the current location into a keyword indicative of at least one of an address of the current location, a place name of the current location, and a name of a matter located near the current location.

6. A text selection method comprising the steps of:
acquiring sensor information outputted from a sensor for detecting a user motion and sensor information outputted from a sensor for obtaining a user current location;

analyzing sensor information from said sensor for detecting a user motion acquired in the sensor information acquisition step to detect an action pattern corresponding to the acquired sensor information from a plurality of action patterns obtained by classifying user's actions that are executed in a comparatively short time of several seconds to several minutes;

converting, on the basis of said sensor information indicative of a current location acquired in the sensor information acquisition step, said information indicative of a current location into at least one keyword associated with current information associated with said current location by use of databases and network search engines;

generating information associated with a place of user's frequent visit and a place of user's probable visit next to the current location by use of information indicative of the current location acquired in the sensor information acquisition step and a log of said information indicative of a current location, wherein said place of user's frequent visit is determined by computing the frequency of the user's visits from the log of said information and calculating a score on the basis of the computed frequency, wherein said place of user's probable visit next to the current location is determined by computing a conditional probability of the user's moving from the current position to each of the places written to the log of said information and calculating a score on the basis of the obtained conditional probability, and wherein said information associated with a place of user's frequent visit and a place of user's probable visit next to the current location is converted into a keyword as in the keyword conversion step; and extracting a text for user presentation from a plurality of texts on the basis of said action pattern detected in the action pattern detection step and said at least one keyword generated in the keyword conversion step.

7. A non-transitory computer-readable medium storing a program for causing, when executed by a processor, a computer capable of communication with a sensor for detecting a user motion and a sensor for detecting a current location to execute a method comprising:

acquiring sensor information outputted from a sensor for detecting a user motion and sensor information outputted from a sensor for obtaining a user current location;

analyzing sensor information from said sensor for detecting a user motion acquired by the sensor information acquisition function to detect an action pattern corresponding to the acquired sensor information from a plurality of action patterns obtained by classifying user's actions that are executed in a comparatively short time of several seconds to several minutes;

converting, on the basis of said sensor information indicative of a current location acquired by the sensor information acquisition function, said information indicative of a current location into at least one keyword associated with current information associated with said current location by use of databases and network search engines;

generating information associated with a place of user's frequent visit and a place of user's probably visit next to the current location by use of information indicative of the current location acquired by said sensor information acquisition function and a log of said information indicative of a current location, wherein said place of user's frequent visit is determined by computing the frequency of the user's from the log of said information and calculating a score on the basis of the computed frequency, wherein said place of user's probable visit next t the current location is determine by computing a conditional probability of the user's moving from the current position to each of the places written to the log of said information and calculating a score on the basis of the obtained conditional probability, and wherein the process further configures said keyword conversion function to convert said information associate with a place of user's frequent visit and a place of user's probable visit next to the current location into a keyword; and extracting a text for user presentation from a plurality of texts on the basis of said action pattern detected by the action pattern detection function and said at least one keyword generated by the keyword conversion function.

8. The information processing apparatus of claim 1, wherein the apparatus is capable of assisting a user in learning a foreign language.

9. The information processing apparatus according to claim 1, wherein the one or more processors are further configured to execute the instructions to:

configure a display control section to control the display of the contents of a display screen, wherein controlling the display comprises referring to the text extracted by the text extraction block, and displaying the text onto the display screen.

10. The information processing apparatus according to claim 9, wherein the one or more processors are further configured to execute the instructions to:

configure a user answer acquisition section configured to execute the instructions to acquire an answer from the user if the text extracted by the text extraction block is phrased as a question prompting the user for an answer, wherein the answer from the user may be directly entered through at least one of a keyboard or touch panel, or entered through the selection of an object on the display screen.

11. The information processing apparatus according to claim 10, wherein the one or more processors are further configured to execute the instructions to:

configure a user answer evaluation section to determine whether the answer from the user is correct or incorrect, wherein determining whether the answer from the user is correct or incorrect comprises acquiring information about the correct answer to the question from the memory, and comparing the answer from the user to the correct answer.

12. The information processing apparatus according to claim 10, wherein the one or more processors are further configured to execute the instructions to:

configure a questioning tendency section to set a tendency in questioning, wherein the tendency may include the preferential presentation of questions similar to a particular question, wherein the tendency may include the preferential presentation of questions of a certain difficulty level, and wherein the tendency may include repeating questions answered incorrectly.

13. The information processing apparatus according to claim 12, where the questioning tendency section further comprises:

a user analysis block configured to execute the instructions to calculate the percentage of correct answers made by the user and compute the difficulty level of the question;

a curve generation block configured to execute the instructions to generate curves on a graph showing time-dependent changes in the percentage of correct answers made by the user; and a questioning condition setting block configured to execute the instructions to compute the similarity between two or more questions and update the percentage of correct answers made by the user.

14. The information processing apparatus according to claim 13, wherein the one or more processors are further configured to execute the instructions to:

configure a question selection section to select a question to be posed to the user from two or more questions based on predetermined criteria, wherein the predetermined criteria includes an evaluation value calculated by the questioning condition setting block and the percentage of correct answers made by the user over a set time period or a set number of questions.

* * * * *